US011782954B2

(12) United States Patent
Tirupati et al.

(10) Patent No.: US 11,782,954 B2
(45) Date of Patent: Oct. 10, 2023

(54) USER IDENTIFIER MATCH AND MERGE PROCESS

(71) Applicant: Salesforce.com, Inc., San Francisco, CA (US)

(72) Inventors: Srinivas Tirupati, Bothell, WA (US); Amit Martu Kamat, Sammamish, WA (US); Jawad Ahmed Ibrahim Katib, Sammamish, WA (US); Raveendrnathan Loganathan, Sammamish, WA (US); Xun Sun, Bellevue, WA (US); Lingyu Deng, Redmond, WA (US); Prasanthi Oruganti, Bothell, WA (US); Hyun Seung Hong, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 280 days.

(21) Appl. No.: 17/163,069

(22) Filed: Jan. 29, 2021

(65) Prior Publication Data

US 2022/0121687 A1  Apr. 21, 2022

Related U.S. Application Data

(60) Provisional application No. 63/094,275, filed on Oct. 20, 2020.

(51) Int. Cl.
| G06F 16/23 | (2019.01) |
| G06F 16/28 | (2019.01) |
| G06F 16/22 | (2019.01) |

(52) U.S. Cl.
CPC ........ *G06F 16/285* (2019.01); *G06F 16/2272* (2019.01); *G06F 16/2379* (2019.01)

(58) Field of Classification Search
CPC . G06F 16/285; G06F 16/2272; G06F 16/2379
See application file for complete search history.

(56) References Cited

U.S. PATENT DOCUMENTS

| 8,271,477 | B2 * | 9/2012 | Sood | G06F 16/972 |
| | | | | 707/791 |
| 11,157,954 | B1 * | 10/2021 | Belanger | G06Q 30/0201 |
| 2013/0046730 | A1 * | 2/2013 | Sood | G06F 16/972 |
| | | | | 715/764 |
| 2014/0222793 | A1 * | 8/2014 | Sadkin | G06F 16/24578 |
| | | | | 707/723 |

(Continued)

*Primary Examiner* — Merilyn P Nguyen
(74) *Attorney, Agent, or Firm* — Holland & Hart LLP

(57) ABSTRACT

A method that includes receiving a first configuration and a second configuration that define a set of rules for matching and merging a set of source data objects that are associated with a tenant and that are received from a plurality of data sources. The method may further include generating a set of merged data objects from the set of source data objects based on an identification of matching values from fields of the set of source data objects and selecting a value for each field of each merged data object having multiple values. The method may further include generating a mapping between primary keys associated with each merged data object and corresponding primary keys of the source data objects. The method may further include storing the merged data objects and the mappings in a first datastore and a second datastore that is different from the first datastore.

19 Claims, 17 Drawing Sheets

(56) References Cited

U.S. PATENT DOCUMENTS

| | | | |
|---|---|---|---|
| 2015/0178135 A1* | 6/2015 | Wang .................... | H04L 45/021 718/104 |
| 2020/0104292 A1* | 4/2020 | Qu ....................... | G06F 16/2365 |
| 2020/0372004 A1* | 11/2020 | Barber .................. | G06F 16/213 |

* cited by examiner

USER IDENTIFIER MATCH AND MERGE PROCESS

CROSS-REFERENCE

The present Application for Patent claims the benefit of U.S. Provisional Patent Application No. 63/094,275 by Kamat et al., entitled "USER IDENTIFIER MATCH AND MERGE PROCESS," filed Oct. 19, 2020, assigned to the assignee hereof, and expressly incorporated by reference herein.

FIELD OF TECHNOLOGY

The present disclosure relates generally to database systems and data processing, and more specifically to user identifier match and merge process.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, the cloud platform may support an application or platform that includes functionality for ingesting data objects from different data sources and performing queries related to the data objects. A data object may include fields and corresponding field values. In some cases, the application or platform may receive multiple data objects with different or conflicting field values for a single contact or individual. In some cases, if a user submits a database query associated with the contact, the query may return both of the conflicting field values for the contact or may otherwise return ambiguous or inaccurate results.

DETAILED DESCRIPTION

Figure 1:
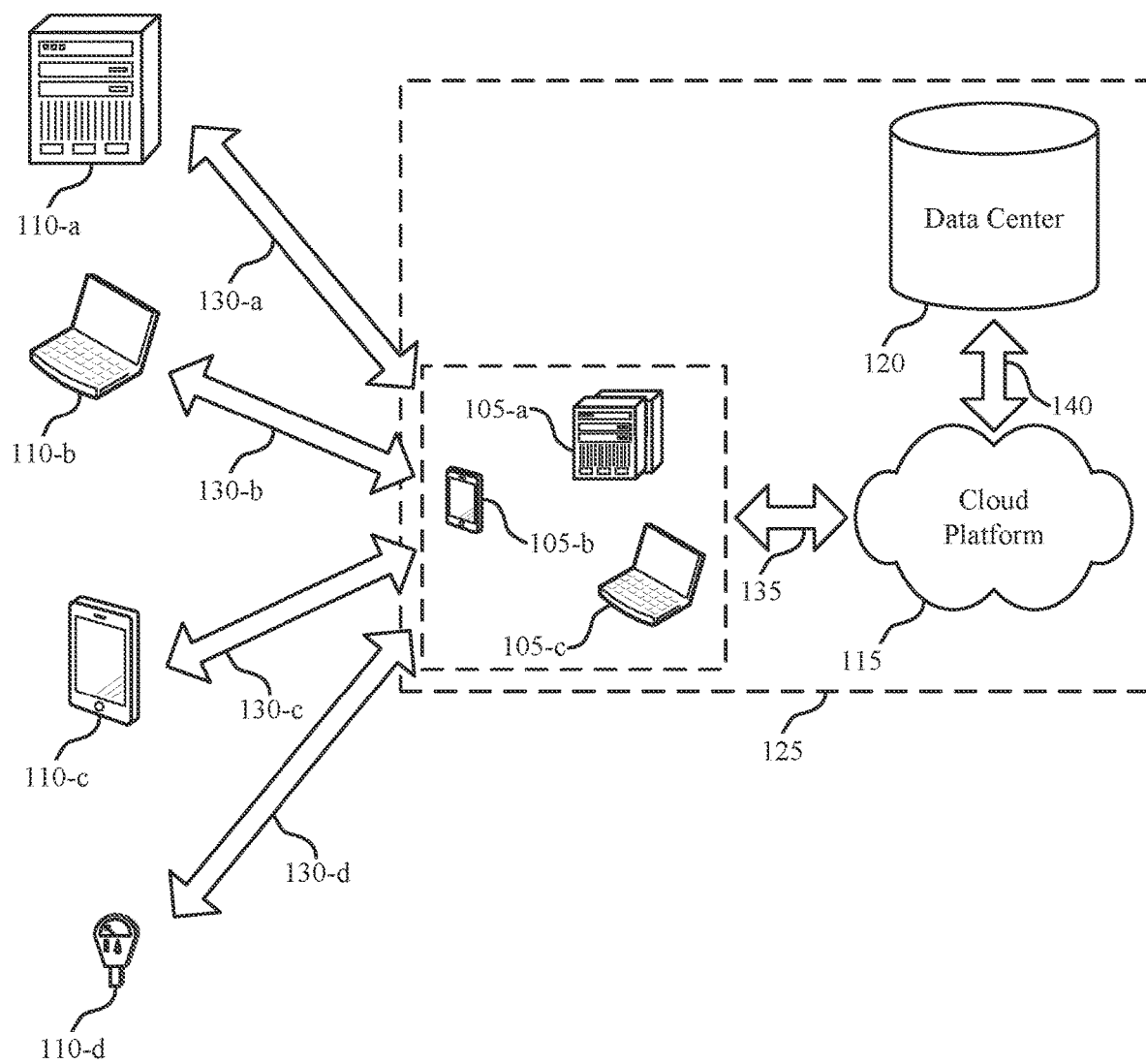
FIG. 1 illustrates an example of a database system that supports user identifier match and merge process in accordance with aspects of the present disclosure.

In some examples, a cloud platform may support an application or platform (e.g., referred to as a customer data platform) that includes functionality for ingesting data objects (e.g., user records) from different data sources (e.g., web browser, point of sale transaction, etc.) and performing queries, segmentation, and other analytic functions related to the data objects. In some cases, the cloud platform may support a multi-tenant database system, and the data objects may correspond to interactions between a tenant of the customer data platform and a contact (e.g., customer) of the tenant. A data object may include fields (e.g., phone number, address, email, nickname) associated with a contact. In some cases, the customer data platform may receive multiple data objects with different or conflicting field values for a single contact. For example, the customer data platform may receive a first data object corresponding to an interaction between a tenant and a contact at a kiosk and may receive a second data object corresponding to an interaction between the tenant and the contact at a mobile application. In such an example, the first data object may include a first email address and the second data object may include a second email address that is different from the first email address. The system may store two separate records or data objects corresponding to these two interactions even though they correspond to a single individual, user, or contact. However, the first data object and the second data object may include conflicting field values for the contact. In some cases, if a user of the customer data platform performs a query associated with the contact to the customer data platform, the query may return both of the conflicting field values for the contact or return duplicated data objects that correspond to a single contact. Thus, it may be difficult for the user to obtain accurate information for the contact from the conflicting field values.

In accordance with the techniques described herein, the customer data platform may perform a match and merge process by identifying a set of data objects with matching field values and merging the identified set of data objects into a unified or merged data object (e.g., referred to as a unified profile). In some examples, the match and merge process may be configured for one or more tenants of a multi-tenant database system, and the customer data platform may initiate the match and merge process based on determining that a trigger condition related to the tenant has been satisfied. The customer data platform may perform the match and merge process according to a configuration associated with the tenant, and each tenant may have the same or different configurations. The configuration may include a set of match rules and a set of reconciliation rules that indicate criteria for identifying data objects with matching field values and combining the identified data objects into a unified profile. To generate a unified profile from the identified set of data objects, the customer data platform may select a value for each field of the unified profile from corresponding field values of the identified set of data objects according to the configuration.

As an illustrative example, the match rules may indicate that any data objects with the same first name and last name fields are a match. Accordingly, the customer data platform may use the match rules to identify a set of matching data objects. The customer data platform may use the reconciliation rules to generate a unified profile for the set of matching data objects based on selecting a value for each field of the unified profile from corresponding field values of the set of matching data objects. For example, if the set of matching data objects includes multiple different phone numbers, the customer data platform may use the reconciliation rules to select a primary phone number for the unified profile from the multiple different phone numbers based on a frequency associated with the primary phone number. That is, the primary phone number may appear in the set of matching data objects more frequently than other phone numbers. In some examples, the reconciliation rules may indicate different rules for different fields. For example, the customer data platform may select a primary email address for the unified profile based on when the primary email address was last updated and may select a primary home address for the unified profile based on a data source from which the primary home address was received.

In addition to generating a unified profile from the set of matching data objects, the customer data platform may also generate a mapping for the unified profile. The mapping may indicate a relationship between the unified profile and the one or more source data objects that were merged and the fields from those source data objects that were selected for the unified profile. For example, the mappings may indicate a relationship between a primary key (e.g., a unique key of a table within a database schema) associated with the unified profile and a corresponding primary key associated with each data object of the set of matching data objects from which the unified profile was generated. The customer data platform may store the unified profile and the mapping in a first relational datastore and a second non-relational datastore. In some examples, the second non-relational datastore may be configured to support low latency queries for the unified profile based on using metadata associated with the unified profile to efficiently access information (e.g., field values) associated with the unified profile. In comparison to querying for individual data objects, querying for unified profiles may provide a user or tenant with more comprehensive and accurate contact information. In addition, such queries may use fewer computational resources and may be associated with lower latency.

Aspects of the disclosure are initially described in the context of an environment supporting an on-demand database service. Aspects of the disclosure are further described with respect to a database system that supports a match and merge service, a data model that illustrates a match and merge process, a database system that supports a multi-tenant match and merge service, a process flow that illustrates trigger conditions associated with performing a match and merge process, a data model that illustrates a key ring mapping diagram, and a process flow that illustrates a match and merge process. Aspects of the disclosure are further illustrated by and described with reference to apparatus diagrams, system diagrams, and flowcharts that relate to user identifier match and merge process.

FIG. 1 illustrates an example of a database system 100 for cloud computing that supports user identifier match and merge process in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, a cloud platform 115 may support an application or service (e.g., referred to herein as, but not limited to, a customer data platform) that includes functionality for ingesting data objects from different data sources and performing queries, segmentation, or other analytical functions related to the data objects. In some cases, the data objects may correspond to interactions between a cloud client 105 of the customer data platform and a contact 110 of the cloud client 105. A data object may include fields and corresponding field values associated with a contact 110. In some cases, the customer data platform may receive multiple data objects with different or conflicting field values for a single contact 110. For example, the customer data platform may receive a first data object corresponding to an interaction between a cloud client 105 and a contact 110 at a kiosk and may receive a second data object corresponding to an interaction between the cloud client 105 and the contact 110 at a mobile application. In some examples, the first data object may include a first email address and the second data object may include a second email address that is different from the first email address. As such, the first data object and the second data object may include conflicting field values (e.g., email addresses) for the contact 110. In some cases, if a user at the cloud client 105 sends a query associated with the contact 110 to the customer data platform, the query may return both of the conflicting field values for the contact 110. Such duplicated data objects or data records being stored by a database system, yet corresponding to a single individual or contact 110, may result in inefficiencies, ambiguous or inaccurate query results, and the like. For example, it may be difficult for the user to obtain accurate information for the contact 110 from the conflicting field values.

In accordance with the techniques described herein, a system (e.g., an application server, a database server, a customer data platform or the like) may perform a match and merge process for the cloud client 105 by identifying a set of data objects with matching field values and merging the identified set of data objects into one or more merged data objects (e.g., a unified profile). A match and merge process may be equivalently referred to herein as a match and merge job. In some examples, the customer data platform may initiate the match and merge process based on determining that a trigger condition related to the cloud client 105 has been satisfied. In some examples, the customer data platform may perform the match and merge process according to a configuration associated with the cloud client 105. The configuration may include a set of match rules and a set of reconciliation rules that indicate criteria for identifying data objects with matching field values and combining the identified data objects into a unified profile. To generate a unified profile from the identified set of data objects, the customer data platform may select a value for each field of the unified profile from corresponding field values of the identified set of data objects.

As an illustrative example, the match rules may include an indication to identify data objects with the same first name and last name fields. Accordingly, the customer data platform may use the match rules to identify a set of matching data objects. The customer data platform may use the reconciliation rules to generate a unified profile for the set of matching data objects based on selecting a value for each field of the unified profile from corresponding field values of the set of matching data objects. For example, if the set of matching data objects includes multiple different phone numbers, the customer data platform may use the reconciliation rules to select a primary phone number (e.g., a master contact point phone field value) for the unified profile from corresponding field values (e.g., contact point email field values) of the set of matching data objects based on a frequency associated with the primary phone number. That is, the primary phone number may appear in the set of matching data objects more frequently than other phone numbers. In some examples, the reconciliation rules may indicate different rules for different fields. For example, the customer data platform may select a primary email address for the unified profile based on when the primary email address was last updated and may select a primary home address for the unified profile based on a data source from which the primary home address was received.

In addition to generating a unified profile from the set of matching data objects, the customer data platform may also generate a mapping for the unified profile. The mapping may indicate a relationship between a primary key associated with the unified profile and a corresponding primary key associated with each data object of the set of matching data objects from which the unified profile was generated. The customer data platform may store the unified profile and the mapping in one or more datastores. For example, the customer data platform may store results of the match and merge data processing job (e.g., the merged data objects and the mappings) in a first datastore (e.g., a relational datastore) and a second datastore (e.g., a non-relational datastore). In some examples, the second non-relational datastore may be configured to support low latency queries for the unified profile based on using metadata (e.g., keys, indices) associated with the unified profile to efficiently access information associated with the unified profile. In comparison to querying for individual data objects, querying for unified profiles may provide the cloud client 105 with more comprehensive and accurate contact information. In addition, such queries may use fewer computational resources and may be associated with lower latency.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
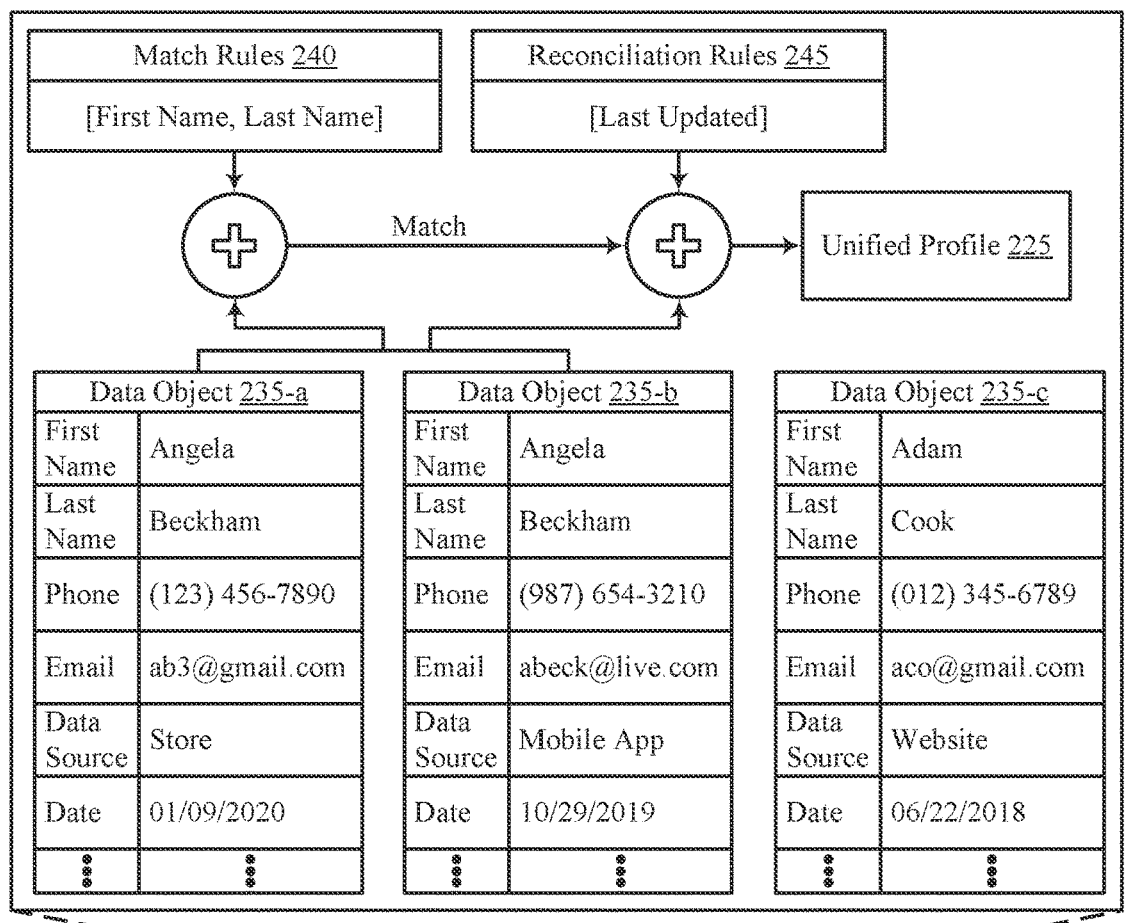
FIG. 2 illustrates an example of a database system that supports user identifier match and merge process in accordance with aspects of the present disclosure.
Figure 2:
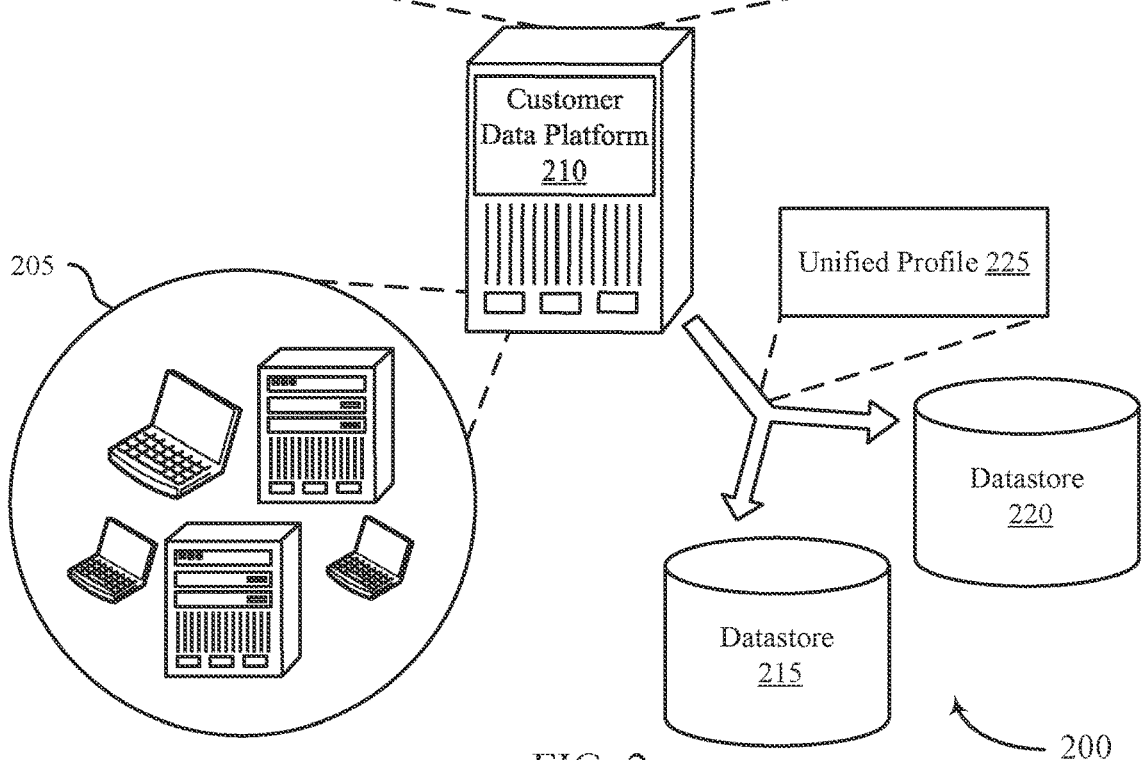

FIG. 2 illustrates an example of a database system 200 that supports user identifier match and merge process in accordance with aspects of the present disclosure. The database system 200 may include a customer data platform 210, which may be supported by a cloud platform 115 as described herein with reference to FIG. 1, and which may be an example of a server (e.g., an application server or a database server), an application or service running on a server, or the like. The database system 200 may also include a first datastore 215 and a second datastore 220, which may be examples of a data center 120 as described herein with reference to FIG. 1. The customer data platform 210 may configure a cluster of computing resources 205 (e.g., servers, virtual machines, cloud resources) to perform a match and merge job for a tenant of the customer data platform 210. The match and merge job may include identifying a set of data objects 235 with matching field values, generating a unified profile 225 from the set of data objects 235, and storing the unified profile 225 in the first datastore 215 and the second datastore 220.

In some cases, the customer data platform 210 may ingest data objects 235 from multiple different data sources. The data objects 235 may be examples of data records that are stored in a datastore and may contain structure or unstructured data, including fields or attributes, and values for one or more of the fields or attributes. The data objects 235 may be associated with a tenant of a multi-tenant database system, and the data objects 235 may correspond to an interaction between the tenant and a contact of the tenant. For example, the data object 235-*a* may correspond to an interaction involving a contact named Angela Beckham. Similarly, the data object 235-*c* may correspond to an interaction involving a contact named Adam Cook. A data object 235 may include a set of fields and a corresponding set of values for the fields. The set of fields may include one or more name fields (e.g., first name, last name), one or more contact information fields (e.g., phone number, email address), one or more address fields (e.g., home address fields, business address fields), and one or more fields related to the interaction from which the data object 235 was generated. For example, the data object 235-*b* may include one or more name fields (e.g., First Name, Last Name), one or more contact information fields (e.g., Phone, Email), and one more fields related to the interaction (e.g., Data Source, Date).

In some cases, data objects 235 may have one or more fields with matching values and one or more fields with mismatching values. For example, the first name and last name fields of the data objects 235-*a* and 235-*b* have matching values (e.g., Angela, Beckham) but the email address fields of the data objects 235-*a* and 235-*b* have mismatching values (e.g., ab3@gmail.com, abeck@live.com). In some cases, the data objects 235-*a* and 235-*b* may correspond to the same contact. In some other cases, the data objects 235-*a* and 235-*b* may correspond to different contacts with the same first name and last name fields. If, for example, a user at the tenant submits a query related to the matching values of the data objects 235-*a* and 235-*b* (e.g., a query for Angela Beckham), the query may return both of the data objects 235-*a* and 235-*b*. As such, it may be difficult for the user to determine whether the data objects 235-*a* and 235-*b* correspond to the intended contact for which the query was submitted. If both the data objects 235-*a* and 235-*b* correspond to the intended contact, it may be difficult for the user to determine which of the mismatching field values is most relevant for the intended contact. Thus, using individual data objects as the basis for queries may lead to inefficient queries and ambiguous results.

In accordance with the techniques described herein, the database system 200 may support performing a match and merge job (e.g., a match and merge process) for the tenant based on identifying a set of data objects 235 with matching field values and generating a unified profile 225 from the set of data objects 235. A value for each field of the unified profile 225 may be selected from corresponding field values of the set of data objects 235. The customer data platform 210 may generate a mapping between the unified profile 225 (e.g., a primary key associated with the unified profile 225 or a field of the unified profile 225) and one or more data objects 235 (e.g., a corresponding primary key associated with each data object 235 of the set of data objects 235 from which the unified profile 225 was generated). The customer data platform 210 may store the unified profile 225 and the mapping in a first datastore 215 (e.g., a relational database system) and a second datastore 220 that is different than the first data store 215 (e.g., a non-relational database system).

In some examples, the customer data platform 210 may perform the match and merge job according to a configuration associated with the tenant. The configuration may include a set of match rules 240 for identifying data objects 235 with matching field values and a set of reconciliation rules 245 for generating a unified profile 225 from the identified data objects 235. For example, the set of match rules 240 may include an indication to identify data objects 235 with matching values for one or more fields. Accordingly, the customer data platform 210 may identify a set of data objects 235 with matching values for the indicated one or more fields and may generate a unified profile 225 from the set of data objects 235. The indicated one or more fields of the unified profile 225 may include the matching values from the set of data objects 235. If, for example, the set of data objects 235 has mismatching values for fields other than the indicated one or more fields, the customer data platform 210 may use the reconciliation rules 245 to select a value for the other fields of the unified profile 225 from the mismatching values of the set of data objects 235.

In some examples, the customer data platform 210 may perform the match and merge job in response to determining that a trigger condition related to the tenant has been satisfied. The trigger condition may include an enablement condition, a repeated failure threshold, a daily quota, a mapping condition, a new data condition, a mapping update condition, or a combination thereof as described herein with reference to FIG. 5. If the customer data platform 210 determines that the trigger condition has been satisfied, the customer data platform 210 may invoke a match and merge process for the tenant. Otherwise, the customer data platform 210 may refrain from performing a match and merge process for the tenant (e.g., by skipping the match and merge process until a next scheduled time or trigger event occurrence).

The customer data platform 210 may generate a mapping between a primary key associated with the unified profile 225 and a corresponding primary key associated with each data object 235 of the set of data objects 235 from which the unified profile 225 was generated. The unified profile and the mapping may have a one-to-many (e.g., 1:N) relationship, whereas each data object 235 of the set of data objects 235 may have a one-to-one (e.g., 1:1) relationship with the mapping. Stated another way, each data object 235 may be associated with a single mapping, whereas the unified profile 225 may be associated with multiple mappings. The customer data platform 210 may use the mapping to retrieve information (e.g., field values) associated with a data object 235 of the set of data objects 235 via the unified profile 225, as described herein with reference to FIG. 6.

The customer data platform 210 may store the unified profile 225 in a first relational datastore 215 and a second non-relational datastore 220. The first relational datastore 215 may support specific queries (e.g., human-time queries), while the second non-relational datastore 220 may support low latency queries. The second non-relational datastore 220 may use a set of keys (e.g., partition and sort keys) and a set of indices to efficiently access information (e.g., field values) associated with the stored unified profile 225. The second non-relational datastore 220 may assign the unified profile 225 to a cluster with other unified profiles 225 that are frequently queried together, such that information associated with unified profiles 225 in the cluster may be efficiently retrieved for subsequent queries.

Figure 3:
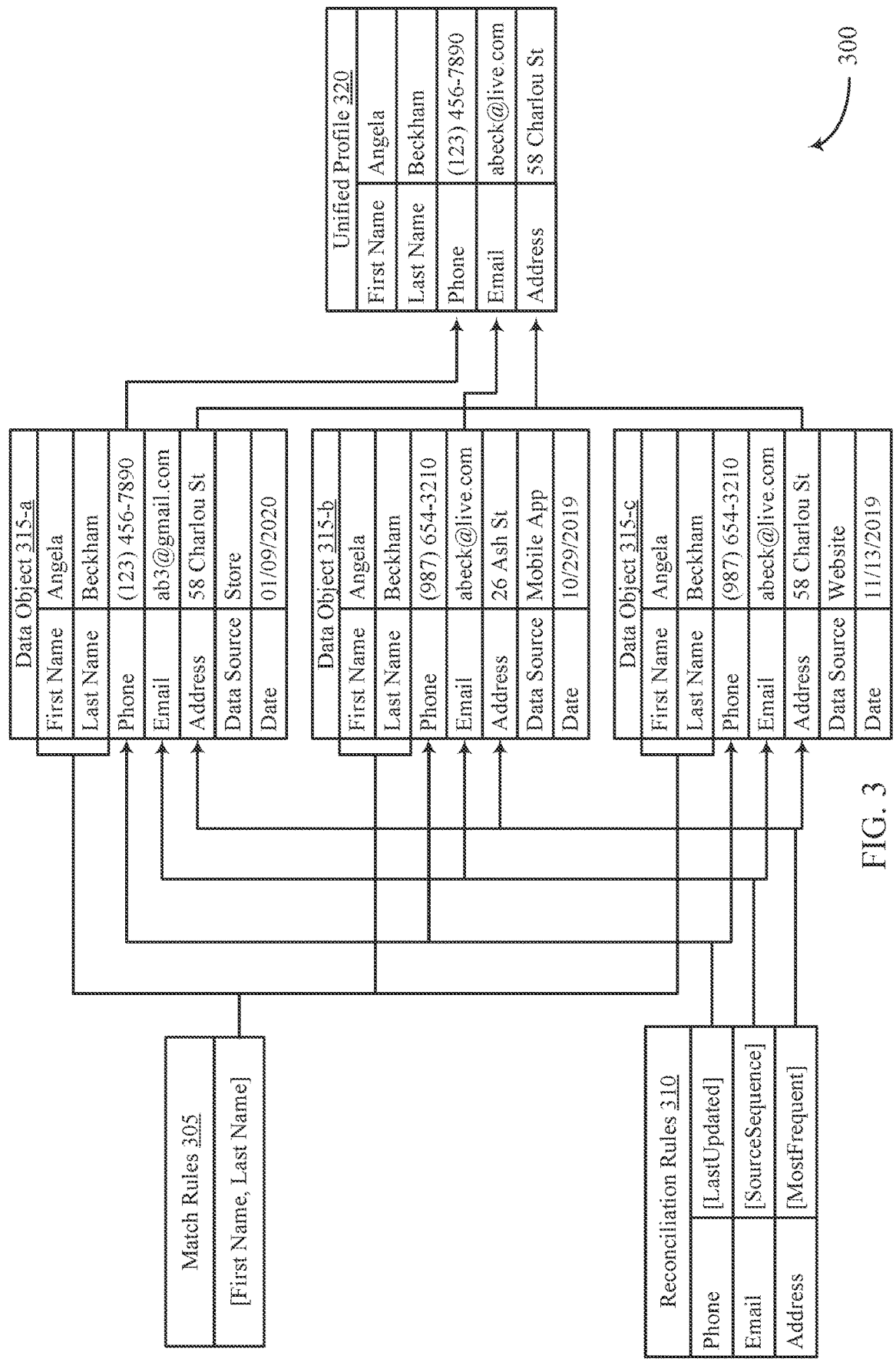
FIG. 3 illustrates an example of a data model that supports user identifier match and merge process in accordance with aspects of the present disclosure.

FIG. 3 illustrates an example of a data model 300 that supports user identifier match and merge process in accordance with aspects of the present disclosure. The data model 300 may include match rules 305 and reconciliation rules 310, which may be examples of match rules 240 and reconciliation rules 245 as described herein with reference to FIG. 2. The data model 300 may also include data objects 315 and a unified profile 320, which may be examples of data objects 235 and a unified profile 225 as described herein with reference to FIG. 2. The data model 300 may be implemented by a customer data platform, which may be a customer data platform 210 as described herein with reference to FIG. 2. In accordance with the data model 300, the customer data platform may identify a set of data objects 315 with matching field values and may generate a unified profile 320 from the set of data objects 315.

In some examples, the customer data platform may perform a match and merge job, equivalently referred to as a match and merge process, for a tenant in accordance with the techniques described herein with reference to FIG. 2. The customer data platform may perform the match and merge job according to a configuration associated with the tenant that includes a set of match rules 305 and a set of reconciliation rules 310. In some examples, the customer data platform may receive a selection of the configuration from a user at the tenant. That is, a user at the tenant may select the set of match rules 305 and the set of reconciliation rules 310 for the match and merge job.

The customer data platform may use the set of match rules 305 to identify data objects 315 with matching values for one or more fields indicated by the set of match rules 305. For example, the one or more fields indicated by the set of match rules 305 may include a first name field and a last name field. Accordingly, the customer data platform may identify data objects 315 with matching values for the first name field and the last name field. As an illustrative example, the customer data platform may identify that the data objects 315-*a*, 315-*b*, and 315-*c* all have matching values for the first name field and the last name field (e.g., Angela, Beckham). In some examples, the set of match rules 305 may indicate more complex rules. For example, the set of match rules 305 may indicate that the one or more fields include a first name field, a last name field, an email address field, a phone number field, or a combination thereof. For example, the system may facilitate the configuration of multiple matching rules that are chained together. As such, a matching rule may be configured to identify a match based on the following example rule: (FirstName+LastName and Email) OR (Email and PhoneNumber) OR (FirstName+LastName and PhoneNumber). If, for example, the one or more fields indicated by the set of match rules 305 had also included an email address field, the data platform may have only identified the data objects 315-*b* and 315-*c* because the email address field value of the data object 315-*a* (e.g., ab3@gmail.com) is different from the email address field value of the data objects 315-*b* and 315-*c* (e.g., abeck@live.com). Thus, the set of match rules 305 may determine which data objects 315 are identified by the customer data platform.

In some examples, the customer data platform may implement a probabilistic matching algorithm (e.g., fuzzy matching) to determine whether two field values are considered as a match. The matching algorithm may match two field values even if the two field values are slightly different or not otherwise exactly matching. For example, if the data object 315-*a* includes a first name field value (e.g., Angie) that is slightly different from a first name field value of the data object 315-*b* (e.g., Angela), the matching algorithm may match the two first name field values based on identifying that the first name field value of the data object 315-*a* is a nickname for the first name field value of the data object 315-*b*. Similarly, if an email address field value of the data object 315-*c* (e.g., abeck@live.co) is slightly different from an email address field value of the data object 315-*b* (e.g., abeck@live.com), the matching algorithm may match the two email address field values based on identifying that the email address field value of the data object 315-*c* is missing a letter. As such, the matching algorithm may determine that two corresponding field values are a match even with slight deviations between the two values. The parameters of the fuzzy matching algorithm (e.g., the weights assigned) may be configured for the customer data platform, configured by a user, learned over time based on machine learning techniques, or any combination of these options.

In some examples, the identified data objects 315 may have mismatching values for fields other than the fields indicated by the match rules 305. For example, if the match rules 305 indicates first name and last name fields, the identified data objects 315 may include the data objects 315-*a*, 315-*b*, and 315-*c* because all three data objects have matching values (e.g., Angela, Beckham) for the first name and last name fields. However, the identified set of data objects 315 have two different values for the phone number field (e.g., (123) 456-7890, (987) 654-3210). In such examples, when generating a unified profile 320 from the identified data objects 315, the customer data platform may use the set of reconciliation rules 310 to select values for the other fields of the unified profile 320 from the mismatching values according to criteria included in the set of reconciliation rules 310. For example, the set of reconciliation rules 310 may include an indication to select a value for the phone number field of the unified profile 320 based on when each identified data object 315 was last updated.

In some examples, the set of reconciliation rules 310 may include different criteria for different fields. For example, the set of reconciliation rules 310 may include an indication to select a value for the phone number field of the unified profile 320 based on a recentness criteria (e.g., when each identified data object 315 was last updated), an indication to select a value for the email address field of the unified profile 320 based on a source sequence criteria (e.g., the data source from which each identified data object 315 was ingested), and an indication to select a value for the home address field of the unified profile 320 based on a frequency criteria (e.g., how many times a value occurs within the identified data objects 315). As such, the unified profile 320 may include field values from different identified data objects 315 based on different criteria.

In some examples, the customer data platform may assign a unique identifier to the unified profile 320 (e.g., a key or index assigned to the unified profile 320 upon storage in a relational datastore, a non-relational datastore, or both). If, for example, the unified profile 320 is modified during a subsequent match and merge job (e.g., due to modifying the set of match rules 305, the set of reconciliation rules 310, or both), the customer data platform may preserve the unique identifier for the unified profile 320. As an illustrative example, the customer data platform may generate, during a first match and merge job, the unified profile 320 from the data objects 315-a, 315-b, and 315-c using a first set of reconciliation rules 310. The first set of reconciliation rules 310 may include an indication to select a value for the home address field of the unified profile 320 from corresponding values of the data objects 315-a, 315-b, and 315-c based on a frequency criteria. Accordingly, the customer data platform may select a first value (e.g., 58 Charlou St) for the home address field of the unified profile 320 and may assign a unique identifier to the unified profile 320. However, in some examples, the customer data platform may perform a second match and merge job using a second set of reconciliation rules 310 and may select a different value for the home address field of the unified profile 320 based on the second set of reconciliation rules 310. For example, the second set of reconciliation rules 310 may include an indication to select a value for the home address field of the unified profile 320 based on a source sequence criteria that prioritizes data objects 315 received via a mobile application. As such, the customer data platform may select a new value (e.g., 26 Ash St) for the value of the home address field of the unified profile 320 because the new value is associated with a data object 315 (e.g., the data object 315-b) that was ingested via a mobile application. However, instead of changing the unique identifier assigned to the unified profile 320 to reflect the new home address field value, the customer data platform may preserve the original unique identifier for the unified profile 320.

Figure 4:
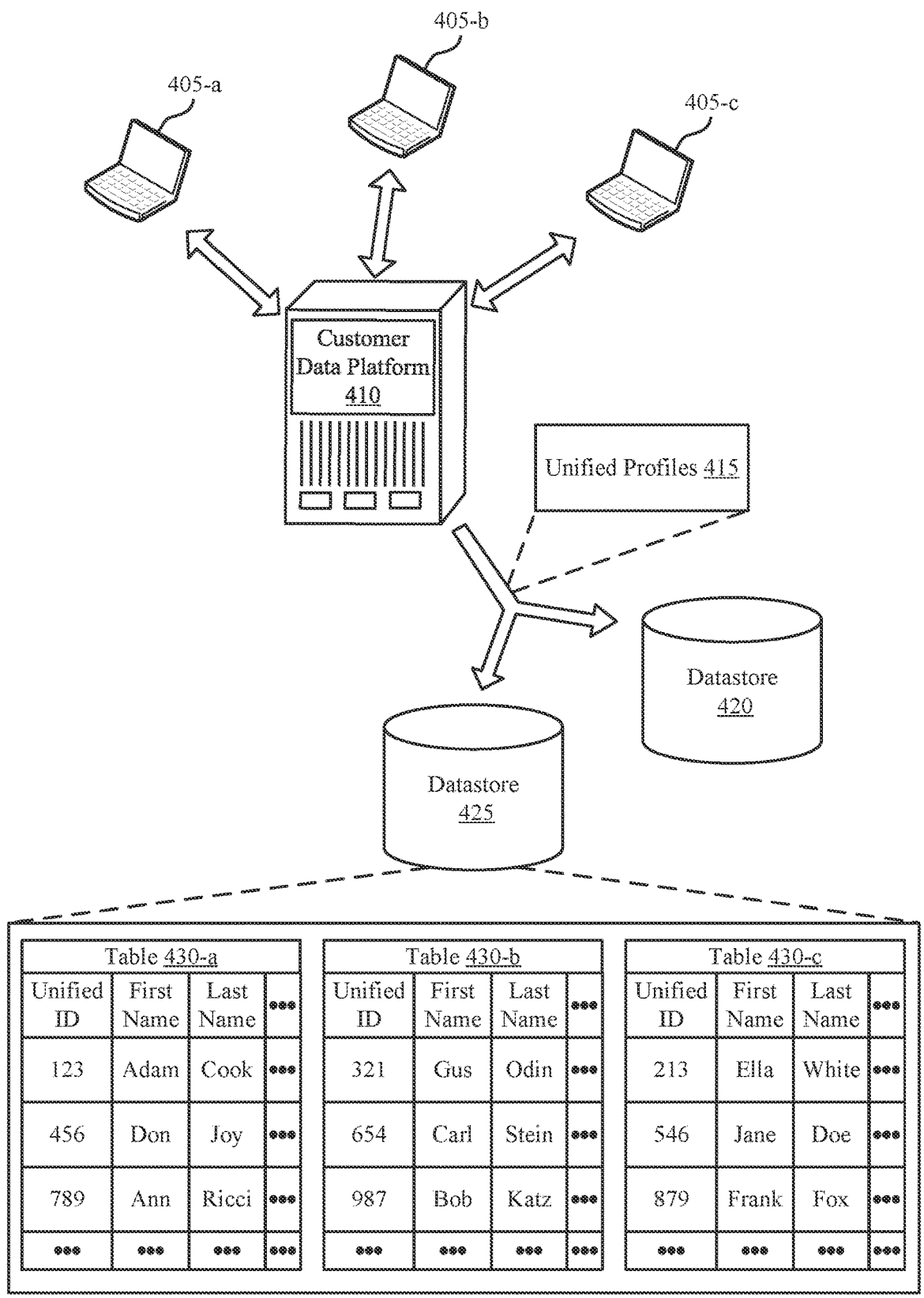
FIG. 4 illustrates an example of a database system that supports user identifier match and merge process in accordance with aspects of the present disclosure.

FIG. 4 illustrates an example of a database system 400 that supports user identifier match and merge process in accordance with aspects of the present disclosure. The database system 400 may include a customer data platform 410, which may be an example of a customer data platform 210 as described herein with reference to FIG. 2. The database system 400 may also include a first relational datastore 420 and a second non-relational datastore 425, which may be examples of a data center 120, a datastore 215, a datastore 220, or a combination thereof as described herein with reference to FIGS. 1 and 2. In addition, the database system may include one or more tenants 405, which may be examples of a cloud client 105 as described herein with reference to FIG. 1. The customer data platform 410 may perform a match and merge job for a tenant 405 by generating a set of unified profiles 415 associated with the tenant 405 and storing the set of unified profiles 415 in the first relational datastore 420 and the second non-relational datastore 425.

In some examples, the customer data platform 410 may perform a match and merge job for a tenant 405-a, a tenant 405-b, a tenant 405-c, or a combination thereof in accordance with the techniques described herein with reference to FIGS. 2 and 3. For example, the customer data platform 410 may perform a match and merge job for the tenant 405-a by generating a set of unified profiles 415 from data objects associated with the tenant 405-a. The customer data platform 410 may also generate a mapping between a set of primary keys associated with the set of unified profiles 415 and a corresponding set of primary keys associated with data objects from which the set of unified profiles 415 was generated. The customer data platform 410 may store both the set of unified profiles 415 and the mapping at the first relational datastore 420 and the second non-relational datastore 425.

In some examples, a user at a tenant 405 may submit a query associated with the set of unified profiles 415 to the customer data platform 410. The customer data platform 410 may modify the query such that the first relational datastore 420, the second non-relational data store 425, or both may process the query. In some examples, the customer data platform 410 may send the modified query to the second non-relational datastore 425. The second non-relational datastore may retrieve unified profiles 415 from the stored set of unified profiles 415 that are relevant to the modified query and may return information associated with the relevant unified profiles 415 to the customer data platform 410. Accordingly, the customer data platform 410 may display the information to the user at the tenant 405. Based on the query, the second non-relational datastore 425 may group the stored set of unified profiles 415 into clusters. Each cluster may include unified profiles 415 that are frequently queried together. As such, the second non-relational datastore 425 may utilize clusters to both reduce latency and improve efficiency for subsequent queries.

In addition to utilizing clusters, the second non-relational datastore 425 may support low latency queries related to the set of unified profiles 415 based on using a set of keys and a set of indices to efficiently retrieve information associated with the set of unified profiles 415. The set of keys and the set of indices may be equivalently referred to as a set of metadata objects and may correspond to the set of unified profiles 415. The set of keys may include a first key (e.g., a partition key) and a second key (e.g., a sort key). The first key may include an identifier associated with a tenant 405 (e.g., the tenant 405 associated with the set of unified profiles 415) and one or more identifiers associated with a specific cluster. The second key may include an identifier associated with a tenant 405 (e.g., the tenant 405 associated with the set of unified profiles 415), an identifier associated with a profile type (e.g., a specific field), and an identifier associated with a specific data object. The second non-relational datastore 425 may use the set of keys to efficiently identify and retrieve information related to a specific unified profile. Likewise, the set of indices may include a first index (e.g., a global secondary index) and a second index (e.g., a local secondary index). The second non-relational datastore 425 may use the set of indices to perform reverse mapping operations related to the set of unified profiles 415. Stated another way, if the second non-relational datastore 425 has access to a unified profile 415, the second non-relational datastore 425 may use the set of indices to locate individual data objects from which the unified profile 415 was generated.

In some examples, the customer data platform 410 may store multiple sets of unified profiles 415 corresponding to the tenants 405-a, 405-b, and 405-c at the second non-relational datastore 425. In some such examples, the second non-relational datastore 425 may employ a table structure with multiple data tables 430, where each data table 430 stores a corresponding set of unified profiles 415. Stated another way, the data table 430-a may store a set of unified profiles 415 associated with the tenant 405-a, the data table 430-*b* may store a set of unified profiles 415-*b* associated with the tenant 405-*b*, and the data table 430-*c* may store a set of unified profiles 415-*c* associated with the tenant 405-*c*. By assigning each set of unified profiles 415 to a different data table 430, the second non-relational datastore 425 may support low latency queries for each tenant 405. Although shown with a table structure for illustrative purposes, it is to be understood that alternative structures may be employed by the second non-relational datastore 425.

In some examples, the second non-relational datastore 425 may be associated with a higher data access cost than the first relational datastore 420. In such cases, to mitigate the higher data access cost of the second non-relational datastore 425, the customer data platform 410 may calculate a difference in data objects between a previous set of unified profiles 415 and a subsequent set of unified profiles 415 based on performing a match and merge job for a tenant 405. Instead of storing the subsequent set of unified profiles 415 in the second non-relational datastore 425, the customer data platform 410 may store the difference in the second non-relational datastore 425 such that the customer data platform 410 may minimize the data access cost associated with the second non-relational datastore 425.

Figure 5:
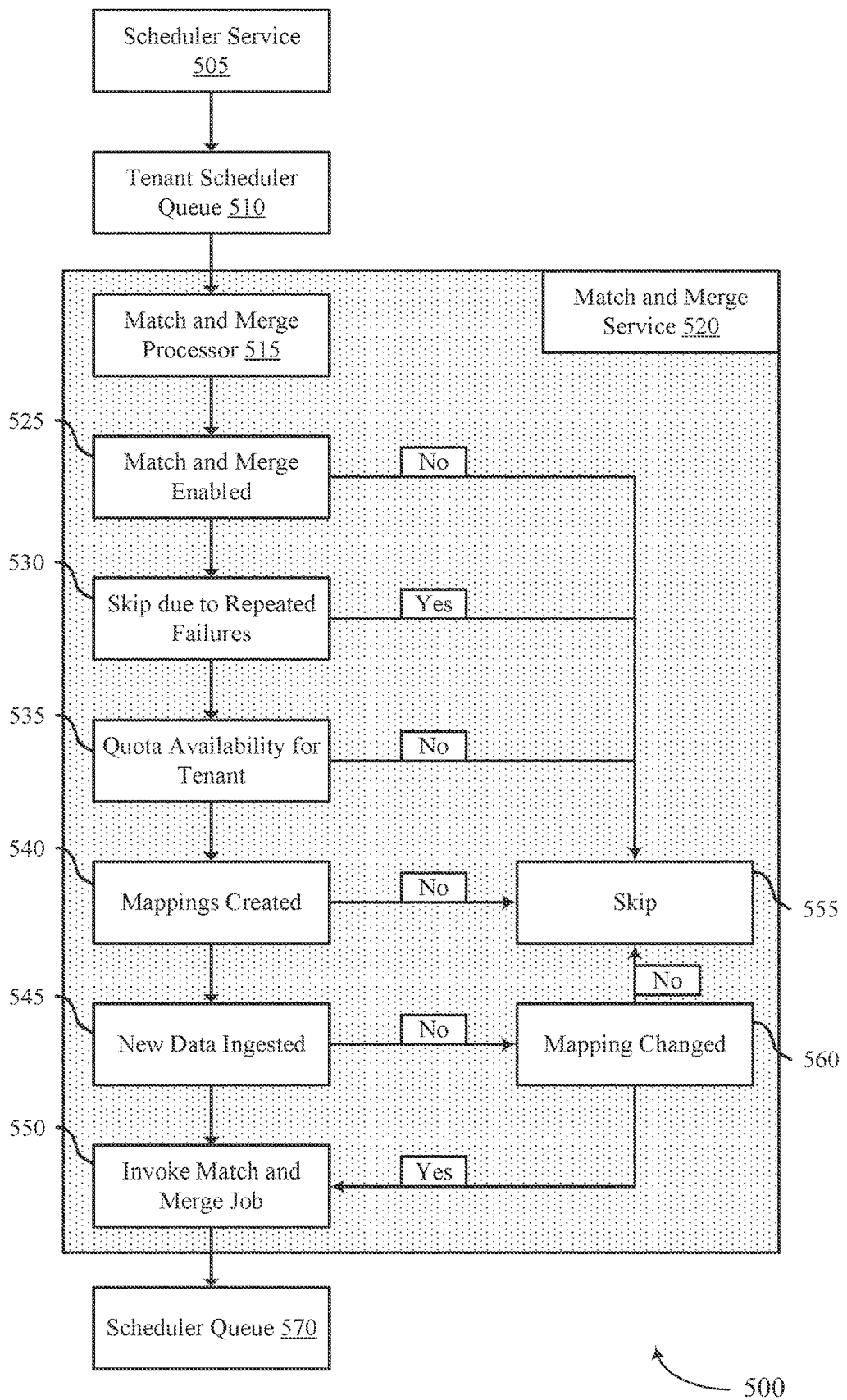
FIG. 5 illustrates an example of a process flow that supports user identifier match and merge process in accordance with aspects of the present disclosure.

FIG. 5 illustrates an example of a process flow 500 that supports user identifier match and merge process in accordance with aspects of the present disclosure. The process flow 500 may be implemented by a customer data platform, which may be a customer data platform 210 or a customer data platform 410 as described herein with reference to FIGS. 2 and 4. The process flow may include a match and merge service 520, a match and merge processor 515, a scheduler service 505, a tenant scheduler queue 510, and a match and merge scheduler queue 570, which may be supported by the customer data platform. In accordance with the process flow 500, the match and merge processor 515 may check a status of one or more conditions associated with a tenant to determine whether or not to perform a match and merge job for the tenant. Additionally, alternative examples of the process flow 500 may be implemented, where some operations may be performed in a different order than described or are not performed at all. In some examples, operations may include additional features not mentioned below, or further processes may be added.

In some examples, a scheduler service 505 may periodically (e.g., every 'x' minutes) send a message to a tenant scheduler queue 510 that is associated with a specific tenant of the customer data platform. Accordingly, the tenant scheduler queue 510 may relay the message to a match and merge processor 515. The match and merge processor 515 may check a status of one or more conditions associated with the tenant to determine whether or not to perform a match and merge job for the tenant. The one or more conditions may include an enablement condition, a repeated failure condition, a daily quota, a mapping condition, a new data condition, a mapping update condition, or a combination thereof.

At 525, the match and merge processor 515 may check a status of an enablement condition for the tenant. The enablement condition may indicate whether or not the match and merge service 520 is enabled for the tenant. If the match and merge processor 515 determines that the match and merge service 520 is enabled for the tenant, the enablement condition may be satisfied for the tenant. In contrast, if the match and merge processor 515 determines that the match and merge service 520 is disabled for the tenant, the match and merge processor 515 may skip the tenant and refrain from invoking a match and merge job for the tenant.

At 530, the match and merge processor 515 may check a status of a repeated failure condition associated with the tenant. The repeated failure condition may indicate whether or not a number of previously attempted match and merge jobs for the tenant were failures. If, for example, the match and merge service 520 attempts to perform a consecutive number of match and merge jobs for the tenant and each attempt is unsuccessful, an alert may be generated and the tenant may be marked (e.g., for skip processing). Accordingly, the match and merge processor 515 may skip the tenant and refrain from invoking a subsequent match and merge job for the tenant. If, however, the tenant is not marked, the repeated failure condition may be satisfied for the tenant.

At 535, the match and merge processor 515 may check a status of a daily quota for the tenant. The daily quota may indicate whether or not a threshold number of match and merge jobs has been performed for the tenant that day. If, for example, the match and merge service 520 performs a number of match and merge jobs for the tenant that reaches or exceeds the threshold number, the match and merge processor 515 may skip the tenant and may refrain from invoking a subsequent match and merge job for the tenant. In contrast, if the threshold number has not been reached or exceeded for the tenant, the daily quota condition may be satisfied for the tenant.

At 540, the match and merge processor 515 may check a status of a mapping condition for the tenant. The mapping condition may indicate whether data objects associated with the tenant have been properly ingested such that the customer data platform may accurately process the data objects. For example, a tenant may have configurations or mappings that indicate how data objects from external sources map to data objects associated with a data model of a customer data platform or similar application. If, for example, the data objects are not properly ingested (e.g., due to missing tags), the match and merge service 520 may experience errors when attempting to perform a match and merge job for the tenant. That is, if mappings for the data objects have not been created, the match and merge service 520 may be unable to perform a match and merge job for the tenant. Alternatively, if the mappings have been created for the data objects, the mapping condition may be satisfied for the tenant.

At 545, the match and merge processor 515 may check a status of a new data condition for the tenant. The new data condition may indicate whether or not new data objects associated with the tenant have been ingested by the customer data platform. If new data objects associated with the tenant have been ingested by the customer data platform, the new data condition may be satisfied for the tenant. Alternatively, if new data objects associated with the tenant have not been ingested by the customer data platform, the match and merge processor 515 may check a mapping update condition for the tenant at 560. The mapping update condition may indicate whether an existing mapping for data objects associated with the tenant has been changed. If the existing mapping has not been changed and new data objects associated with the tenant have not been ingested by the customer data platform, the match and merge processor 515 may skip the tenant and refrain from invoking a match and merge job for the tenant. If the existing mapping has been changed, the mapping update condition may be satisfied for the tenant.

At 550, the match and merge processor 515 may invoke a match and merge job for the tenant based on one or more conditions being satisfied for the tenant. The match and merge processor 515 may invoke the match and merge job for the tenant based on sending a message to a match and merge scheduler queue 570. The match and merge service 520 may check the match and merge scheduler queue 570 and perform a match and merge job for the tenant based on the message. Alternatively, at 555, the match and merge processor 515 may skip the tenant and refrain from invoking a match and merge job for the tenant based on one or more conditions not being satisfied for the tenant.

Figure 6:
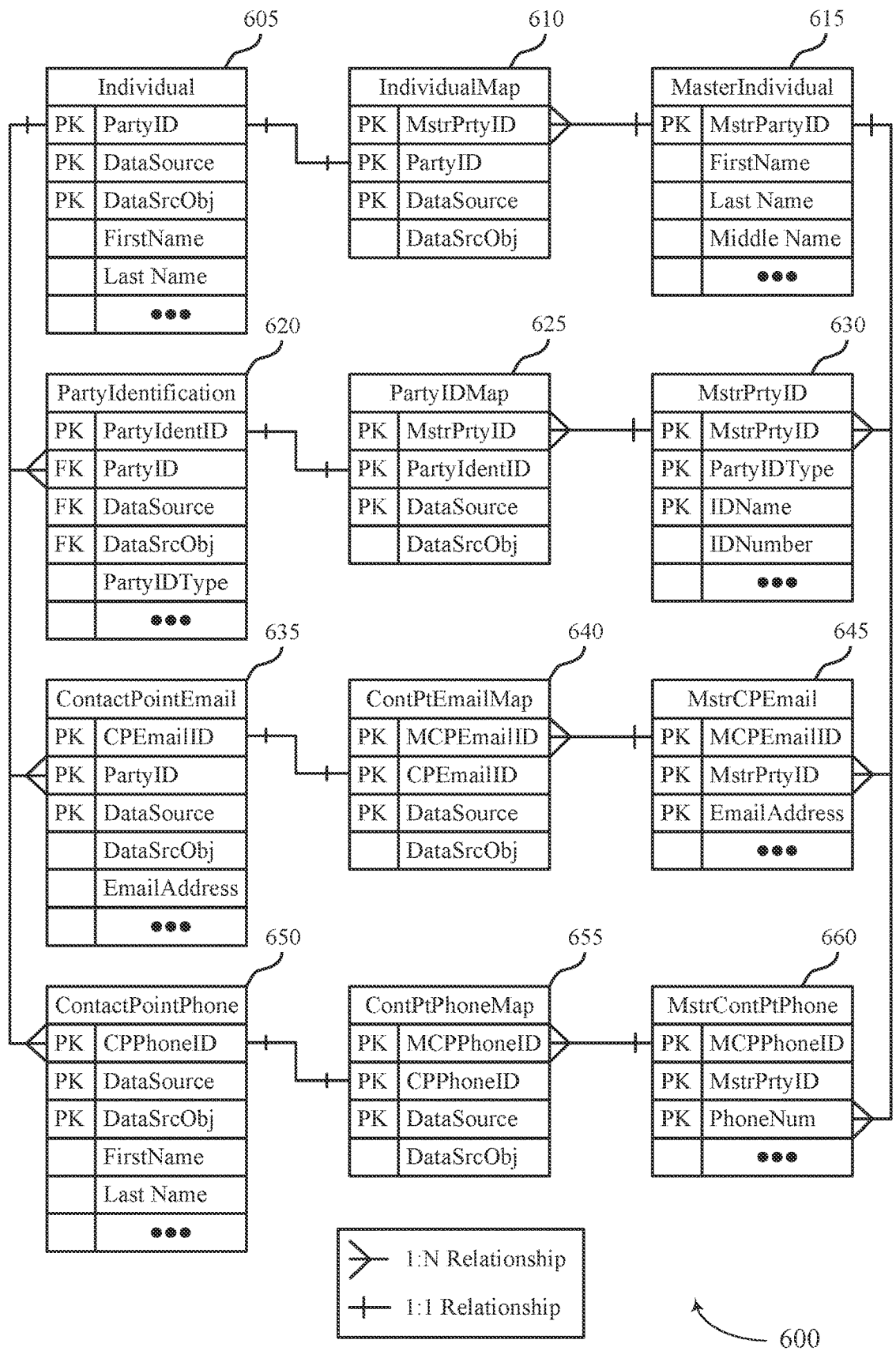
FIG. 6 illustrates an example of a data model that supports user identifier match and merge process in accordance with aspects of the present disclosure.

FIG. 6 illustrates an example of a data model 600 that supports user identifier match and merge process in accordance with aspects of the present disclosure. The data model 600 may be implemented by a customer data platform, which may be a customer data platform 210 or a customer data platform 410 as described herein with reference to FIGS. 2 and 4. The data model 600 may illustrate an example of a key ring mapping structure used by the customer data platform to generate a mapping between a unified profile and a set of data objects from which the unified profile was generated.

A data object may include a set of fields and a corresponding set of values, as described herein with reference to FIGS. 2 and 3. The set of fields may include one or more name fields, one or more contact information fields, one or more home address fields, one or more interaction fields, or a combination thereof. In some examples, each field of the set of fields may be represented as an individual component in the data model 600. For example, a data object may include an individual field 605, a party identification field 620, a contact point email field 635, and a contact point phone number 650. That is, the individual field 605, the party identification field 620, the contact point email field 635, and the contact point phone number 650 may be represented as individual components but may collectively form the data object.

Similarly, a unified profile may include a set of fields and a corresponding set of values, as described herein with reference to FIGS. 2 and 3. For example, the unified profile may include a master individual field 615, a master party identifier field 630, a master contact point email address 645, and a master contact point phone number 660. In some examples, the customer data platform may select values for the set of fields included in the unified profile based on performing a match and merge job. More specifically, the customer data platform may generate the unified profile from a set of data objects and may select values for the set of fields associated with the unified profile from corresponding values associated with the set of data objects. For example, the customer data platform may select a value for a master contact point phone field 660 of the unified profile from a set of values corresponding to contact point phone fields 650 included in the set of data objects.

The customer data platform may use one or more primary keys (PKs) and foreign keys (FKs) to generate a mapping between the unified profile and the set of data objects from which the unified profile was generated. The mapping may include a map for each field of each data object in the set of data objects. For example, each contact point email field 635 of each data object in the set of data objects may have a corresponding contact point email map 640. Stated another way, each contact point email field 635 may have a unique contact point email map 640. The customer data platform may link each contact point email field 635 to the corresponding unique contact point email map 640 using a primary key. Similarly, the customer data platform may link each unique contact point email map 640 to the master contact email field 645 using a primary key. That is, the master contact email field 645 may be linked to multiple contact point email maps 640 that correspond to contact point email fields 635 for each data object in the set of data objects.

The customer data platform may be able to access each field of each data object in the set of data objects via the unified profile based on using the mapping between the unified profile and the set of data objects. For example, the customer data platform may be able to access a party identification field 620 of a specific data object in the set of data objects using the master party identification field 630 of the unified profile and a party identification map 625 corresponding to the party identification field 620. More specifically, the customer data platform may utilize links between primary keys associated with the master party identification field 630, the party identification map 625, and the party identification field 620 to locate the party identification field 620 via the master party identification field 630. Likewise, the customer data platform may use a specific field of a specific data object to locate the corresponding field of the unified profile to which the specific data object belongs. For example, the customer data platform may use an individual field 605 and a corresponding individual map 610 to locate a master individual field 615 of the unified profile. As such, the customer data platform may use relationships between fields associated with the set of data objects and fields associated with the unified profile to perform mapping operations, reverse mapping operations, or both.

In addition to linking each field of the unified profile to corresponding fields of the set of data objects, the mapping may use a primary key to form links between fields of the unified profile. For example, the mapping may utilize a primary key to link a master individual field 615, a master party identifier field 630, a master contact point email field, a master contact point phone field 660, or a combination thereof together such that the customer data platform may use a first field of the unified profile to access a second field of the unified profile via the mapping. Similarly, the customer data platform may use a first field of a specific data object to access a second field of the specific data object via the mapping. For example, the customer data platform may use the mapping to locate a party identification field 620 of a specific data object from a contact point phone field 650 of the specific data object.

In some examples, an identifier associated with a data object may also be associated with an engagement or any other type of interaction with a downstream service that updates and records data for source data objects. The engagement may include information (e.g., an order amount) related to an interaction (e.g., transaction) with a contact at a data source (e.g., a website). If the data object associated with the identifier is merged into a unified profile during a match and merge job, the related engagement may also be mapped to the unified profile using a map between the data object and the engagement. For example, a data object that records website purchase for a user may include an identifier for that transaction, some information about that transaction (e.g., purchase amount), and an identifier for that individual that is associated with a source object identifier associated with the individual. The mapping that is generated by the customer data platform may link the unified identifier associated with an individual with the source object user identifier. As such, the unified profile may include or map to multiple engagements related to data objects from which the unified profile was generated. The customer data platform may use the unified profile, a mapping between the unified profile and the data objects, and a mapping between the data objects and the multiple engagements to perform operations related to the multiple engagements. For example, the customer data platform may determine that the contact associated with the unified profile has spent a threshold amount in interactions corresponding to the multiple engagements. Likewise, the customer data platform may trace a specific engagement back to a unified profile based on using a mapping between the specific engagement and a data object and a mapping between the data object and the unified profile. Additionally, once the mappings are generated, new data, records, or source objects generated by such downstream services may be captured and then correlated back up to the unified profile associate with an individual.

Figure 7:
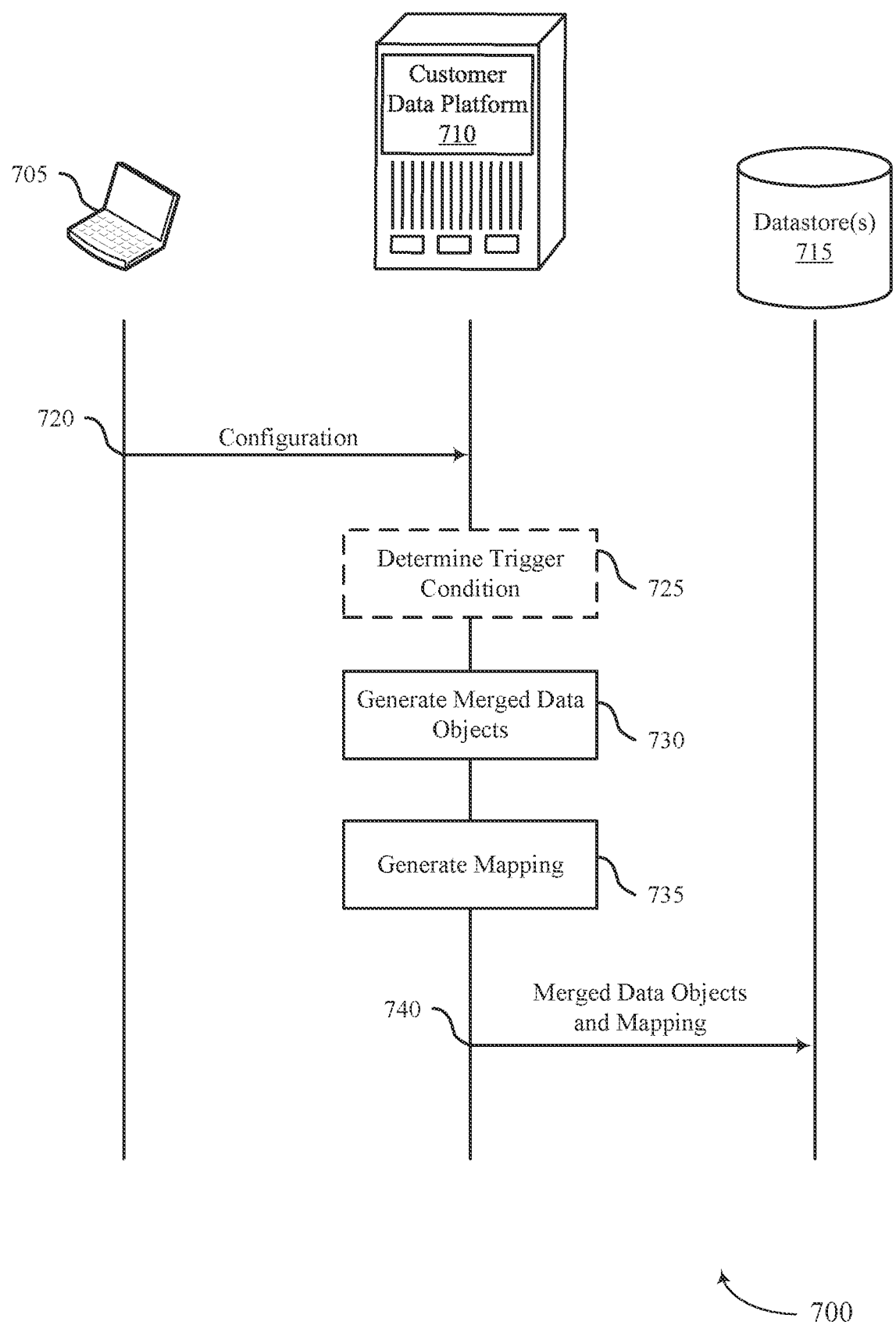
FIG. 7 illustrates an example of a process flow that supports user identifier match and merge process in accordance with aspects of the present disclosure.

FIG. 7 illustrates an example of a process flow 700 that supports user identifier match and merge process in accordance with aspects of the present disclosure. The process flow 700 may be implemented by a tenant 705, a customer data platform 710, and one or more datastores 715. The tenant 705 may be an example of a cloud client 105 as described herein with reference to FIG. 1. The customer data platform may be an example of a customer data platform 210 and 410 as described herein with reference to FIGS. 2 and 4. The one or more datastores 715 may be examples of a data center 120 as described herein with reference to FIG. 1. In accordance with the process flow 700, the customer data platform 710 may perform a match and merge job for the tenant 705. Additionally, alternative examples of the process flow 500 may be implemented, where some operations may be performed in a different order than described or are not performed at all. In some examples, operations may include additional features not mentioned below, or further processes may be added.

At 720, the customer data platform 710 may receive a first configuration and a second configuration for the tenant 705. The first configuration and the second configuration may define a set of rules for matching and merging a set of source data objects associated with the tenant 705. In some examples, the customer data platform 710 may receive, from a user associated with the tenant 705, a selection of parameters for both the first configuration and the second configuration. The customer data platform 710 may receive the set of source data objects from one or more data sources. Each source data object of the set of source data objects may have multiple fields and a corresponding value for each field. The multiple fields may include, for example, one or more name fields, one or more contact information fields, one or more address fields, or a combination thereof.

In some examples, at 725, the customer data platform 710 may determine that a scheduled trigger condition associated with performing a match and merge job for the tenant 705 has been satisfied. The customer data platform 710 may initiate the match and merge job for the tenant 705 based on determining that the trigger condition has been satisfied. In some examples, the customer data platform 710 may initiate the match and merge job for the tenant 705 based on checking a status of one or more conditions configured for the tenant 705. The one or more conditions configured for the tenant 705 may include a match and merge enablement condition, a repeated failure threshold, a daily quota for the tenant 705, a mapping condition, a new data condition, a mapping update condition, or a combination thereof. In some examples, initiating the match and merge job for the tenant 705 may include provisioning a cluster of computational resources at a first database system to perform the match and merge job. The first database system may be different from a second database system that stores the first configuration and the second configuration for the tenant 705.

At 730, the customer data platform 710 may generate a set of merged data objects (e.g., unified profiles) from the set of source data objects based on an identification, according to the first configuration, of matching values from fields of the set of source data objects. More specifically, the customer data platform may identify a subset of source data objects that have matching values for a first set of fields and mismatching values for a second set of fields. The customer data platform 710 may determine that the subset of source data objects satisfies a matching criteria based on the matching values for the first set of fields and the first configuration. The customer data platform 710 may select a value for each field of each merged data object from a corresponding field of the set of source data objects according to the second configuration. The second configuration may include rules for determining which value to select for each field of each merged data object. In some examples, the rules may indicate a data source type associated with a source data object, a recentness of data input associated with a source data object, a frequency of data input associated with a source data object, or a combination thereof.

At 735, the customer data platform 710 may generate a mapping between a primary key of each merged data object and a corresponding primary key of each source data object from which each merged data object was generated. In some examples, the customer data platform 710 may also assign a unique identifier to each merged data object. If, for example, the customer data platform 710 updates one or more fields of a merged data object based on a subsequent match and merge job, the customer data platform 710 may preserve the unique identifier for the merged data object after updating the one or more fields.

At 740, the customer data platform 710 may store the set of merged data objects and the mapping in a first datastore 715 and a second datastore 715. The first datastore may include a relational database and the second datastore may include a non-relational database. In some examples, the customer data platform 710 may calculate a difference in data objects between the set of merged data objects and a subsequent set of merged data objects generated from a subsequent match and merge job for the tenant 705. The customer data platform may store the subsequent set of merged data objects in the first datastore 715 and may store the difference in the second datastore based on the second datastore having a higher data access cost than the first datastore. In some examples, the difference may include a set of new merged data objects, a set of updated merged data objects, or both.

In some examples, the customer data platform 710 may generate a set of metatdata objects for the set of merged data objects that are stored in the second datastore 715. The set of metadata objects may define relationships between clusters of merged data objects stored in the second datastore 715 based on a partition key and a sort key. More specifically, the set of metadata objects may define fields of the merged data objects that are configured for indexing. In some examples, the customer data platform 710 may define indices in the second datastore 715 to link the partition key with the sort key for the set of merged data objects that are stored in the second data store 715.

Figure 8:
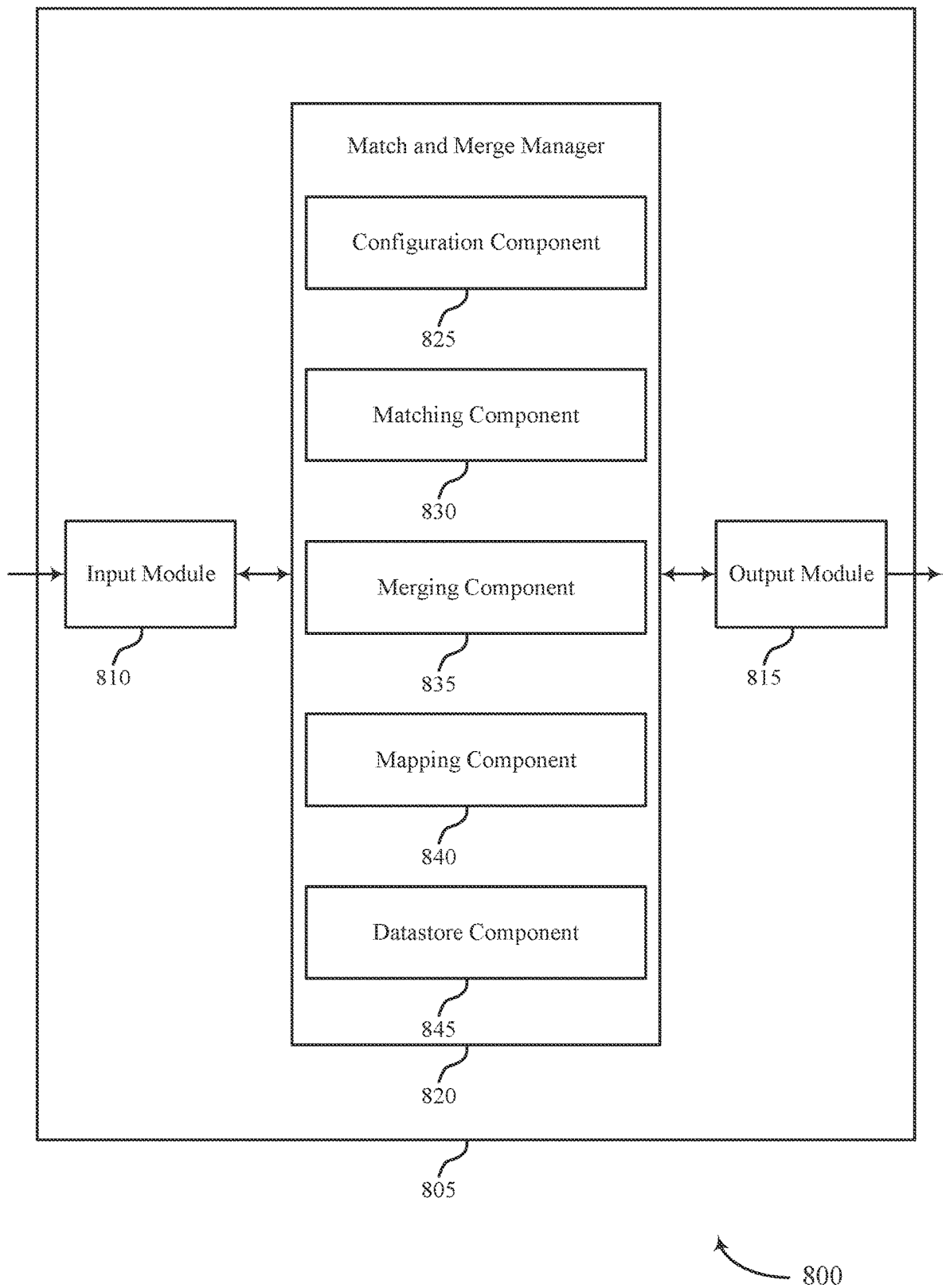
FIG. 8 shows a block diagram of an apparatus that supports user identifier match and merge process in accordance with aspects of the present disclosure.

FIG. 8 shows a block diagram 800 of a device 805 that supports user identifier match and merge process in accordance with aspects of the present disclosure. The device 805 may include an input module 810, an output module 815, and a match and merge manager 820. The device 805 may also include a processor. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the match and merge manager 10 to support user identifier match and merge process. In some cases, the input module 810 may be a component of an I/O controller 1010 as described with reference to FIG. 10.

The output module 815 may manage output signals for the device 805. For example, the output module 815 may receive signals from other components of the device 805, such as the match and merge manager 820, and may transmit these signals to other components or devices. In some specific examples, the output module 815 may transmit output signals for display in a user interface, for storage in a database or data store, for further processing at a server or server cluster, or for any other processes at any number of devices or systems. In some cases, the output module 815 may be a component of an I/O controller 1010 as described with reference to FIG. 10.

For example, the match and merge manager 820 may include a configuration component 825, a matching component 830, a merging component 835, a mapping component 840, a datastore component 845, or any combination thereof. In some examples, the match and merge manager 820, or various components thereof, may be configured to perform various operations (e.g., receiving, monitoring, transmitting) using or otherwise in cooperation with the input module 810, the output module 815, or both. For example, the match and merge manager 820 may receive information from the input module 810, send information to the output module 815, or be integrated in combination with the input module 810, the output module 815, or both to receive information, transmit information, or perform various other operations as described herein.

The configuration component 825 may be configured as or otherwise support a means for receiving a first configuration and a second configuration for a tenant, wherein the first configuration and the second configuration define a set of rules for matching and merging a set of source data objects that are associated with the tenant and that are received from a plurality of data sources. The matching component 830 may be configured as or otherwise support a means for generating a set of merged data objects from the set of source data objects based at least in part on an identification, according to the first configuration, of matching values from fields of the set of source data objects. The merging component 835 may be configured as or otherwise support a means for selecting, according to the second configuration, a value for each field of each merged data object of the set of merged data objects having multiple values. The mapping component 840 may be configured as or otherwise support a means for generating a mapping between a primary key of each merged data object of the set of merged data objects and a corresponding primary key of a source data object of the set of source data objects from which the selected value for a field of the merged data object was selected. The datastore component 845 may be configured as or otherwise support a means for storing, in a first datastore and in a second datastore different from the first datastore, the set of merged data objects and the mapping.

Figure 9:
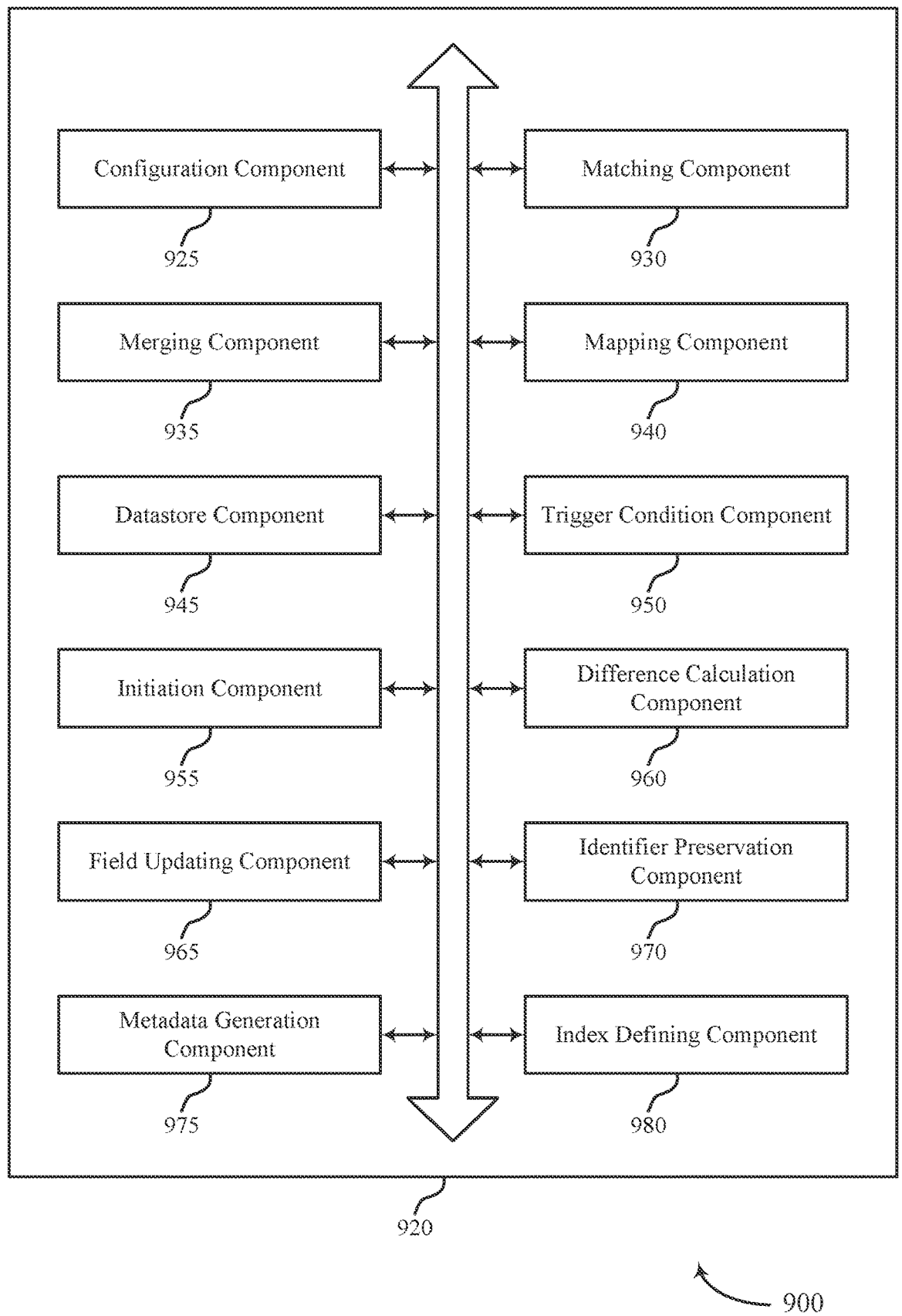
FIG. 9 shows a block diagram of a match and merge manager that supports user identifier match and merge process in accordance with aspects of the present disclosure.

FIG. 9 shows a block diagram 900 of a match and merge manager 920 that supports user identifier match and merge process in accordance with aspects of the present disclosure. The match and merge manager 920 may be an example of aspects of a match and merge manager or a match and merge manager 820, or both, as described herein. The match and merge manager 920, or various components thereof, may be an example of means for performing various aspects of user identifier match and merge process as described herein. For example, the match and merge manager 920 may include a configuration component 925, a matching component 930, a merging component 935, a mapping component 940, a datastore component 945, a trigger condition component 950, an initiation component 955, a difference calculation component 960, a storage component 965, a difference storage component 970, a unique identifier component 975, a field updating component 980, an identifier preservation component 985, a metadata generation component 990, a cluster provisioning component 995, an index defining component 9100, or any combination thereof. Each of these components may communicate, directly or indirectly, with one another (e.g., via one or more buses).

The configuration component 925 may be configured as or otherwise support a means for receiving a first configuration and a second configuration for a tenant, wherein the first configuration and the second configuration define a set of rules for matching and merging a set of source data objects that are associated with the tenant and that are received from a plurality of data sources. The matching component 930 may be configured as or otherwise support a means for generating a set of merged data objects from the set of source data objects based at least in part on an identification, according to the first configuration, of matching values from fields of the set of source data objects. The merging component 935 may be configured as or otherwise support a means for selecting, according to the second configuration, a value for each field of each merged data object of the set of merged data objects having multiple values. The mapping component 940 may be configured as or otherwise support a means for generating a mapping between a primary key of each merged data object of the set of merged data objects and a corresponding primary key of a source data object of the set of source data objects from which the selected value for a field of the merged data object was selected. The datastore component 945 may be configured as or otherwise support a means for storing, in a first datastore and in a second datastore different from the first datastore, the set of merged data objects and the mapping.

In some examples, to support user identifier match and merge process, the matching component 930 may be configured as or otherwise support a means for identifying a subset of source data objects that have matching values for a first set of fields and mismatching values for a second set of fields. In some examples, to support user identifier match and merge process, the matching component 930 may be configured as or otherwise support a means for determining that the subset of source data objects satisfy a matching criteria based at least in part on the matching values for the first set of fields and the first configuration.

In some examples, the second configuration comprises rules for determining which value for each field of the merged data object having multiple field values to select based at least in part on a data source type associated with the source data object, a recentness of data input associated with the source data object, a frequency of data input associated with the source data object, or a combination thereof.

In some examples, the trigger condition component 950 may be configured as or otherwise support a means for determining that a scheduled trigger condition associated with performing a matching and merging data processing job for the tenant has been satisfied. In some examples, the initiation component 955 may be configured as or otherwise support a means for initiating the matching and merging data processing job for the tenant based at least in part on determining that the trigger condition has been satisfied.

In some examples, to support initiating the matching and merging data processing job, the initiation component 955 may be configured as or otherwise support a means for checking a status of one or more conditions configured for the tenant.

In some examples, the one or more conditions configured for the tenant comprises a match and merge process enablement condition, a repeated failure threshold, a processing job quota for the tenant, a required mapping condition, a new data condition, a mapping update condition, or a combination thereof.

In some examples, to support initiating the matching and merging data processing job, the cluster provisioning component 995 may be configured as or otherwise support a means for provisioning a cluster of computational resources in a first database system to perform the matching and merging data processing job, wherein the first database system is different from a second database system that stores the first configuration and the second configuration for the tenant.

In some examples, the difference calculation component 960 may be configured as or otherwise support a means for calculating a difference in data objects between the set of merged data objects and a subsequent set of merged data objects generated from a subsequent matching and merging data processing job for the tenant. In some examples, the storage component 965 may be configured as or otherwise support a means for storing the subsequent set of merged data objects in the first datastore. In some examples, the difference storage component 970 may be configured as or otherwise support a means for storing the difference in data objects in the second datastore based at least in part on the second datastore having a higher data access cost than the first datastore.

In some examples, the difference in data objects comprises a set of new merged data objects, a set of updated merged data objects, or both.

In some examples, the unique identifier component 975 may be configured as or otherwise support a means for assigning a unique identifier to each merged data object of the set of merged data objects. In some examples, the field updating component 980 may be configured as or otherwise support a means for updating one or more fields of a first merged data object based at least in part on a subsequent matching and merging data processing job. In some examples, the identifier preservation component 985 may be configured as or otherwise support a means for preserving the unique identifier for the first merged data object after the updating the one or more fields of the first merged data object.

In some examples, to support user identifier match and merge process, the configuration component 925 may be configured as or otherwise support a means for receiving a selection from a user associated with the tenant of parameters of the first configuration and parameters of the second configuration.

In some examples, the fields of the set of source data objects comprise one or more name fields, one or more contact information fields, one or more address fields, or a combination thereof In some examples, the first datastore comprises a relational database and the second datastore comprises a non-relational database.

In some examples, the metadata generation component 990 may be configured as or otherwise support a means for generating a set of metadata objects for the set of merged data objects that are stored in the second datastore, wherein the set of metadata objects define relationships between clusters of merged data objects stored in the second datastore based at least in part on a partition key and a sort key.

In some examples, the set of metadata objects define fields of the merged data objects that are configured for indexing.

In some examples, the index defining component 9100 may be configured as or otherwise support a means for defining an index in the second datastore defining relationships between the partition key and the sort key for the set of merged data objects that are stored in the second datastore.

Figure 10:
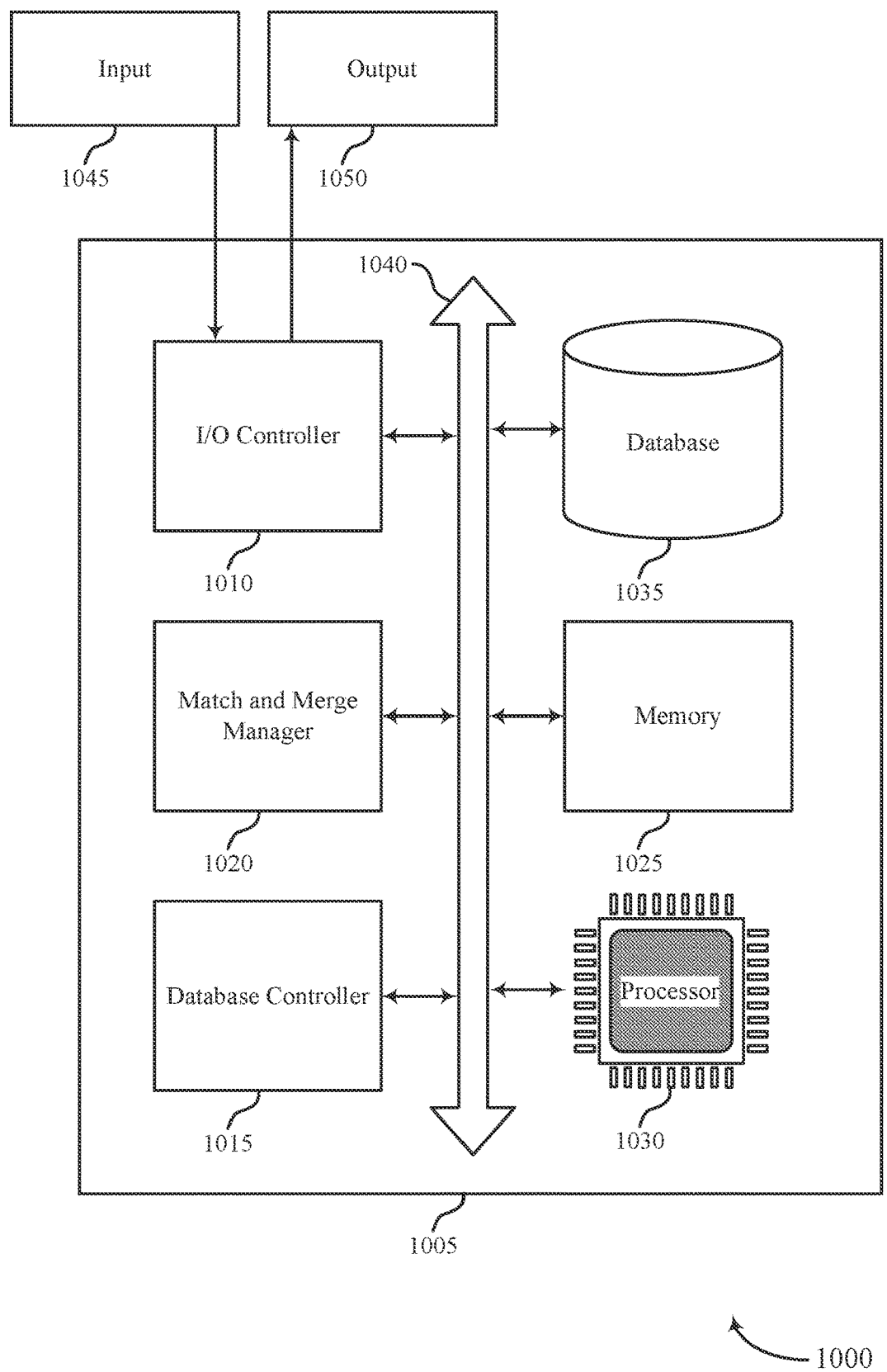
FIG. 10 shows a diagram of a system including a device that supports user identifier match and merge process in accordance with aspects of the present disclosure.

FIG. 10 shows a diagram of a system 1000 including a device 1005 that supports user identifier match and merge process in accordance with aspects of the present disclosure. The device 1005 may be an example of or include the components of a device 805 as described herein. The device 1005 may include components for bi-directional data communications including components for transmitting and receiving communications, such as a match and merge manager 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor. In some cases, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and ROM. The memory 1025 may store computer-readable, computer-executable software including instructions that, when executed, cause the processor to perform various functions described herein. In some cases, the memory 1025 may contain, among other things, a basic input/output system (BIOS) which may control basic hardware or software operation such as the interaction with peripheral components or devices.

The processor 1030 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting user identifier match and merge process).

For example, the match and merge manager 1020 may be configured as or otherwise support a means for receiving a first configuration and a second configuration for a tenant, wherein the first configuration and the second configuration define a set of rules for matching and merging a set of source data objects that are associated with the tenant and that are received from a plurality of data sources. The match and merge manager 1020 may be configured as or otherwise support a means for generating a set of merged data objects from the set of source data objects based at least in part on an identification, according to the first configuration, of matching values from fields of the set of source data objects. The match and merge manager 1020 may be configured as or otherwise support a means for selecting, according to the second configuration, a value for each field of each merged data object of the set of merged data objects having multiple values. The match and merge manager 1020 may be configured as or otherwise support a means for generating a mapping between a primary key of each merged data object of the set of merged data objects and a corresponding primary key of a source data object of the set of source data objects from which the selected value for a field of the merged data object was selected. The match and merge manager 1020 may be configured as or otherwise support a means for storing, in a first datastore and in a second datastore different from the first datastore, the set of merged data objects and the mapping.

Figure 11:
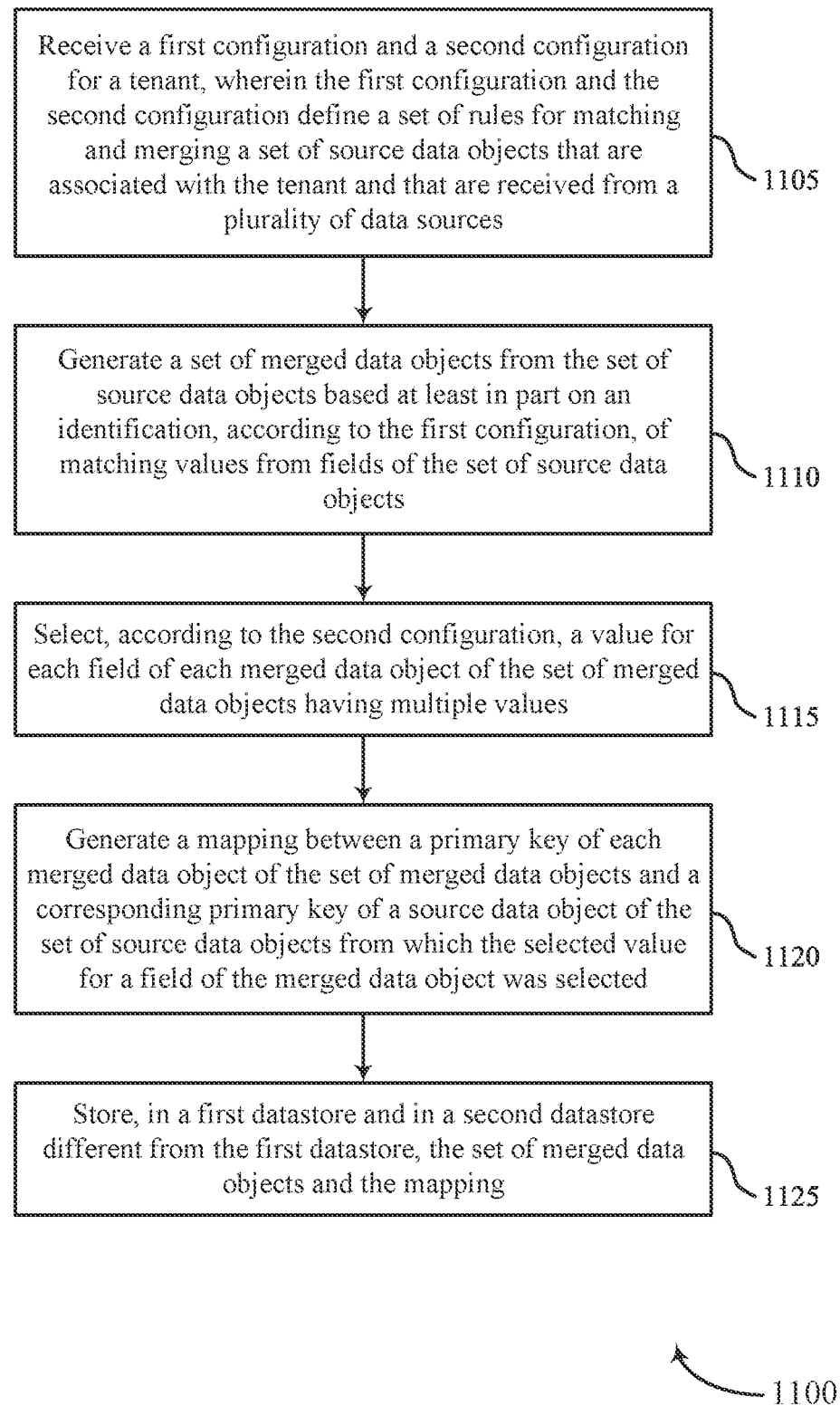
FIGS. 11 through 17 show flowcharts illustrating methods that support user identifier match and merge process in accordance with aspects of the present disclosure.

FIG. 11 shows a flowchart illustrating a method 1100 that supports user identifier match and merge process in accordance with aspects of the present disclosure. The operations of the method 1100 may be implemented by an application server or its components as described herein. For example, the operations of the method 1100 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1105, the method may include receiving a first configuration and a second configuration for a tenant, wherein the first configuration and the second configuration define a set of rules for matching and merging a set of source data objects that are associated with the tenant and that are received from a plurality of data sources. The operations of 1105 may be performed in accordance with examples as disclosed herein. In some examples, aspects of the operations of 1105 may be performed by a configuration component 925 as described with reference to FIG. 9.

At 1110, the method may include generating a set of merged data objects from the set of source data objects based at least in part on an identification, according to the first configuration, of matching values from fields of the set of source data objects. The operations of 1110 may be performed in accordance with examples as disclosed herein. In some examples, aspects of the operations of 1110 may be performed by a matching component 930 as described with reference to FIG. 9.

At 1115, the method may include selecting, according to the second configuration, a value for each field of each merged data object of the set of merged data objects having multiple values. The operations of 1115 may be performed in accordance with examples as disclosed herein. In some examples, aspects of the operations of 1115 may be performed by a merging component 935 as described with reference to FIG. 9.

At 1120, the method may include generating a mapping between a primary key of each merged data object of the set of merged data objects and a corresponding primary key of a source data object of the set of source data objects from which the selected value for a field of the merged data object was selected. The operations of 1120 may be performed in accordance with examples as disclosed herein. In some examples, aspects of the operations of 1120 may be performed by a mapping component 940 as described with reference to FIG. 9.

At 1125, the method may include storing, in a first datastore and in a second datastore different from the first datastore, the set of merged data objects and the mapping. The operations of 1125 may be performed in accordance with examples as disclosed herein. In some examples, aspects of the operations of 1125 may be performed by a datastore component 945 as described with reference to FIG. 9.

Figure 12:
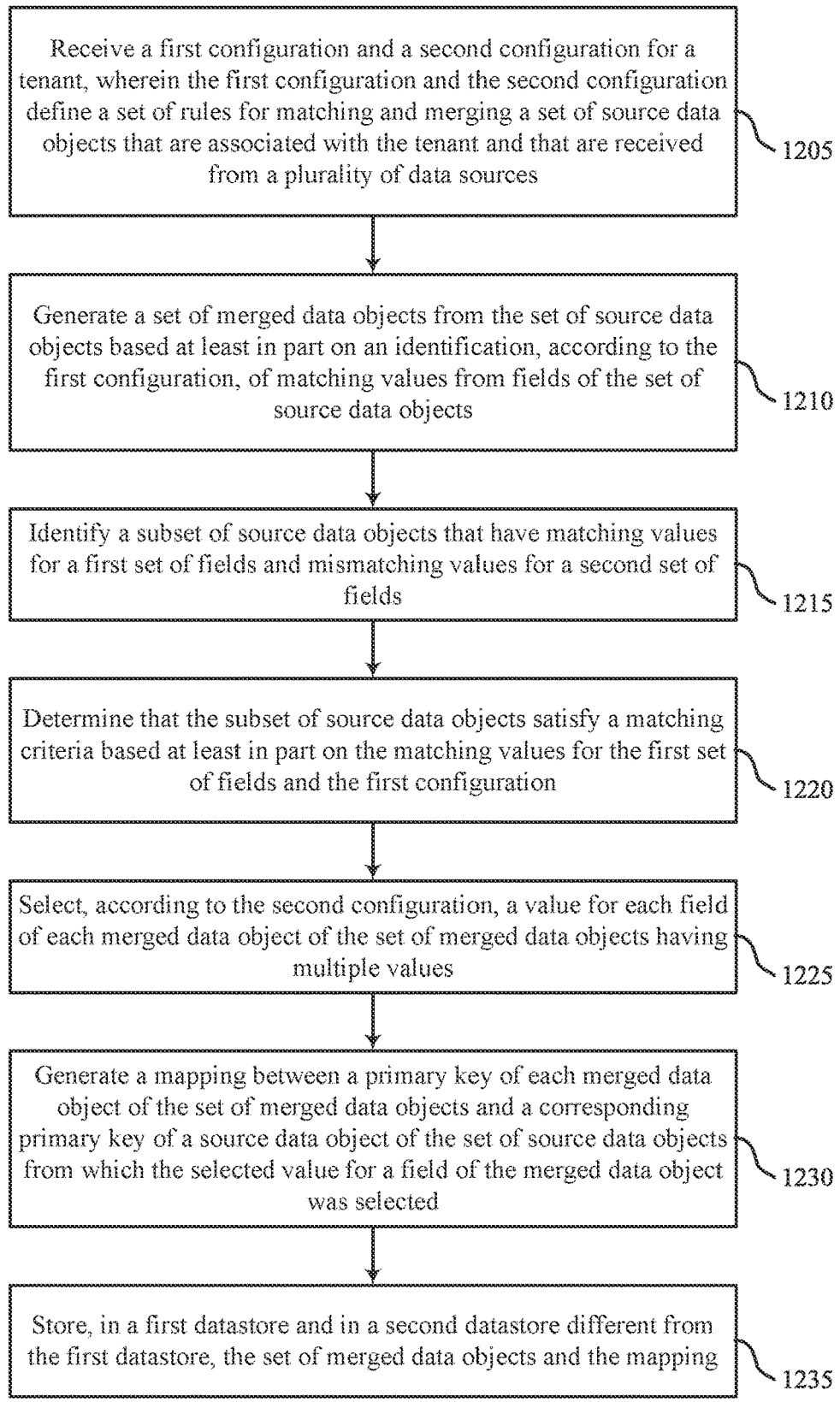

FIG. 12 shows a flowchart illustrating a method 1200 that supports user identifier match and merge process in accordance with aspects of the present disclosure. The operations of the method 1200 may be implemented by an application server or its components as described herein. For example, the operations of the method 1200 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1205, the method may include receiving a first configuration and a second configuration for a tenant, wherein the first configuration and the second configuration define a set of rules for matching and merging a set of source data objects that are associated with the tenant and that are received from a plurality of data sources. The operations of 1205 may be performed in accordance with examples as disclosed herein. In some examples, aspects of the operations of 1205 may be performed by a configuration component 925 as described with reference to FIG. 9.

At 1210, the method may include generating a set of merged data objects from the set of source data objects based at least in part on an identification, according to the first configuration, of matching values from fields of the set of source data objects. The operations of 1210 may be performed in accordance with examples as disclosed herein. In some examples, aspects of the operations of 1210 may be performed by a matching component 930 as described with reference to FIG. 9.

At 1215, the method may include identifying a subset of source data objects that have matching values for a first set of fields and mismatching values for a second set of fields. The operations of 1215 may be performed in accordance with examples as disclosed herein. In some examples, aspects of the operations of 1215 may be performed by a matching component 930 as described with reference to FIG. 9.

At 1220, the method may include determining that the subset of source data objects satisfy a matching criteria based at least in part on the matching values for the first set of fields and the first configuration. The operations of 1220 may be performed in accordance with examples as disclosed herein. In some examples, aspects of the operations of 1220 may be performed by a matching component 930 as described with reference to FIG. 9.

At 1225, the method may include selecting, according to the second configuration, a value for each field of each merged data object of the set of merged data objects having multiple values. The operations of 1225 may be performed in accordance with examples as disclosed herein. In some examples, aspects of the operations of 1225 may be performed by a merging component 935 as described with reference to FIG. 9.

At 1230, the method may include generating a mapping between a primary key of each merged data object of the set of merged data objects and a corresponding primary key of a source data object of the set of source data objects from which the selected value for a field of the merged data object was selected. The operations of 1230 may be performed in accordance with examples as disclosed herein. In some examples, aspects of the operations of 1230 may be performed by a mapping component 940 as described with reference to FIG. 9.

At 1235, the method may include storing, in a first datastore and in a second datastore different from the first datastore, the set of merged data objects and the mapping. The operations of 1235 may be performed in accordance with examples as disclosed herein. In some examples, aspects of the operations of 1235 may be performed by a datastore component 945 as described with reference to FIG. 9.

Figure 13:
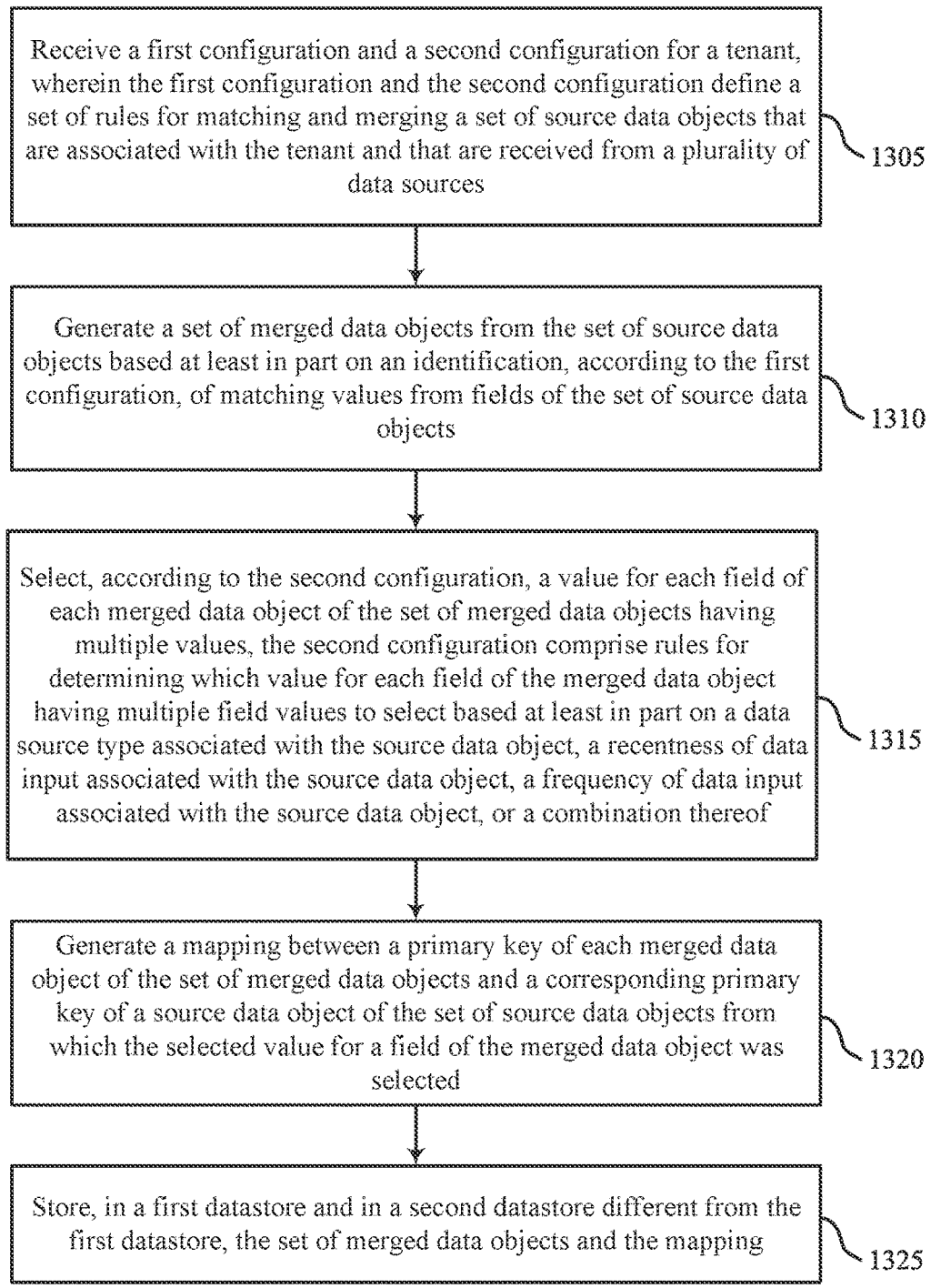

FIG. 13 shows a flowchart illustrating a method 1300 that supports user identifier match and merge process in accordance with aspects of the present disclosure. The operations of the method 1300 may be implemented by an application server or its components as described herein. For example, the operations of the method 1300 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1305, the method may include receiving a first configuration and a second configuration for a tenant, wherein the first configuration and the second configuration define a set of rules for matching and merging a set of source data objects that are associated with the tenant and that are received from a plurality of data sources. The operations of 1305 may be performed in accordance with examples as disclosed herein. In some examples, aspects of the operations of 1305 may be performed by a configuration component 925 as described with reference to FIG. 9.

At 1310, the method may include generating a set of merged data objects from the set of source data objects based at least in part on an identification, according to the first configuration, of matching values from fields of the set of source data objects. The operations of 1310 may be performed in accordance with examples as disclosed herein. In some examples, aspects of the operations of 1310 may be performed by a matching component 930 as described with reference to FIG. 9.

At 1315, the method may include selecting, according to the second configuration, a value for each field of each merged data object of the set of merged data objects having multiple values. In some examples, the second configuration comprises rules for determining which value for each field of the merged data object having multiple field values to select based at least in part on a data source type associated with the source data object, a recentness of data input associated with the source data object, a frequency of data input associated with the source data object, or a combination thereof. The operations of 1315 may be performed in accordance with examples as disclosed herein. In some examples, aspects of the operations of 1315 may be performed by a merging component 935 as described with reference to FIG. 9.

At 1320, the method may include generating a mapping between a primary key of each merged data object of the set of merged data objects and a corresponding primary key of a source data object of the set of source data objects from which the selected value for a field of the merged data object was selected. The operations of 1325 may be performed in accordance with examples as disclosed herein. In some examples, aspects of the operations of 1325 may be performed by a mapping component 940 as described with reference to FIG. 9.

At 1325, the method may include storing, in a first datastore and in a second datastore different from the first datastore, the set of merged data objects and the mapping. The operations of 1330 may be performed in accordance with examples as disclosed herein. In some examples, aspects of the operations of 1330 may be performed by a datastore component 945 as described with reference to FIG. 9.

Figure 14:
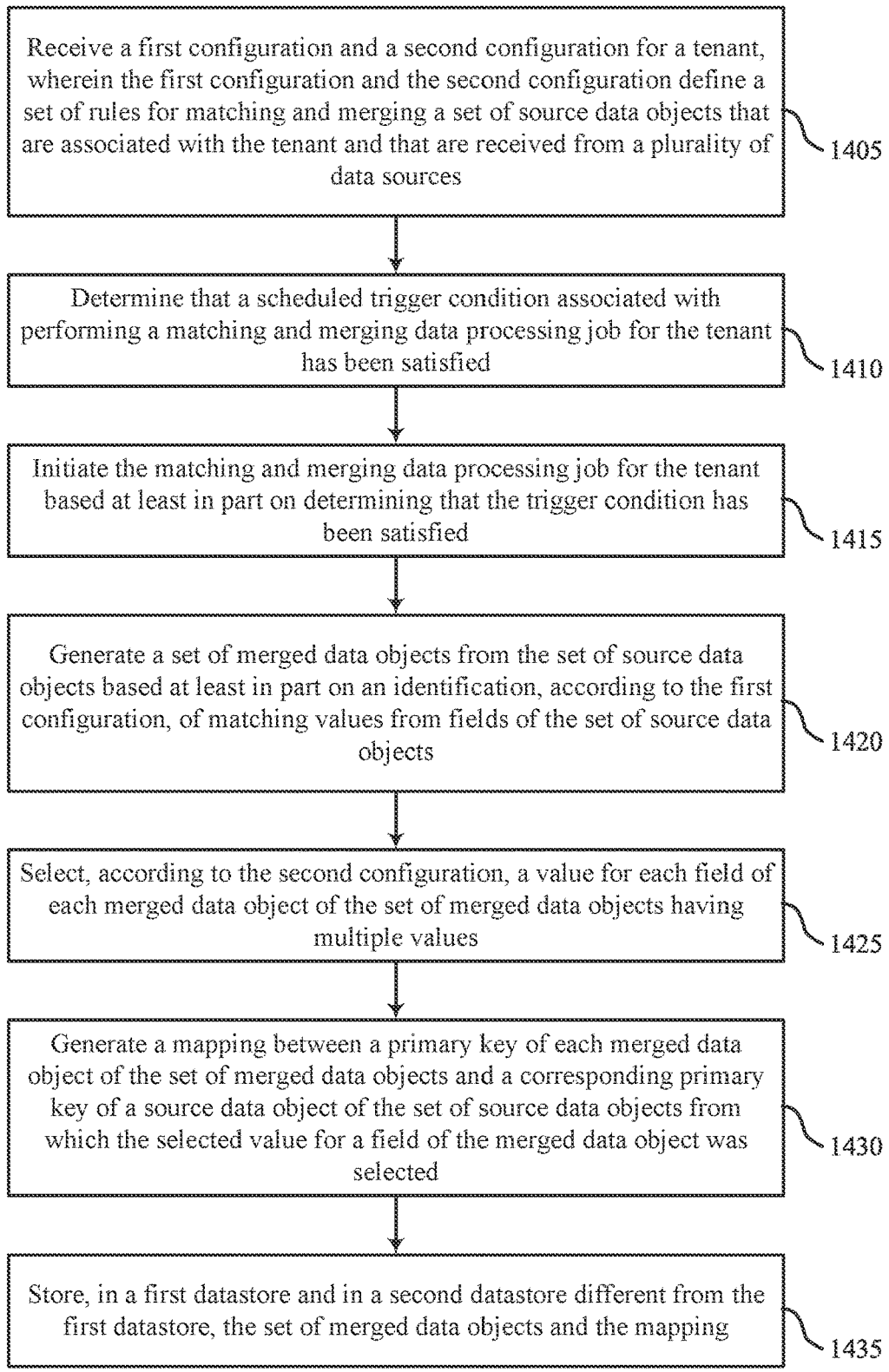

FIG. 14 shows a flowchart illustrating a method 1400 that supports user identifier match and merge process in accordance with aspects of the present disclosure. The operations of the method 1400 may be implemented by an application server or its components as described herein. For example, the operations of the method 1400 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1405, the method may include receiving a first configuration and a second configuration for a tenant, wherein the first configuration and the second configuration define a set of rules for matching and merging a set of source data objects that are associated with the tenant and that are received from a plurality of data sources. The operations of 1405 may be performed in accordance with examples as disclosed herein. In some examples, aspects of the operations of 1405 may be performed by a configuration component 925 as described with reference to FIG. 9.

At 1410, the method may include determining that a scheduled trigger condition associated with performing a matching and merging data processing job for the tenant has been satisfied. The operations of 1410 may be performed in accordance with examples as disclosed herein. In some examples, aspects of the operations of 1410 may be performed by a trigger condition component 950 as described with reference to FIG. 9.

At 1415, the method may include initiating the matching and merging data processing job for the tenant based at least in part on determining that the trigger condition has been satisfied. The operations of 1415 may be performed in accordance with examples as disclosed herein. In some examples, aspects of the operations of 1415 may be performed by an initiation component 955 as described with reference to FIG. 9.

At 1420, the method may include generating a set of merged data objects from the set of source data objects based at least in part on an identification, according to the first configuration, of matching values from fields of the set of source data objects. The operations of 1420 may be performed in accordance with examples as disclosed herein. In some examples, aspects of the operations of 1420 may be performed by a matching component 930 as described with reference to FIG. 9.

At 1425, the method may include selecting, according to the second configuration, a value for each field of each merged data object of the set of merged data objects having multiple values. The operations of 1425 may be performed in accordance with examples as disclosed herein. In some examples, aspects of the operations of 1425 may be performed by a merging component 935 as described with reference to FIG. 9.

At 1430, the method may include generating a mapping between a primary key of each merged data object of the set of merged data objects and a corresponding primary key of a source data object of the set of source data objects from which the selected value for a field of the merged data object was selected. The operations of 1430 may be performed in accordance with examples as disclosed herein. In some examples, aspects of the operations of 1430 may be performed by a mapping component 940 as described with reference to FIG. 9.

At 1435, the method may include storing, in a first datastore and in a second datastore different from the first datastore, the set of merged data objects and the mapping. The operations of 1435 may be performed in accordance with examples as disclosed herein. In some examples, aspects of the operations of 1435 may be performed by a datastore component 945 as described with reference to FIG. 9.

Figure 15:
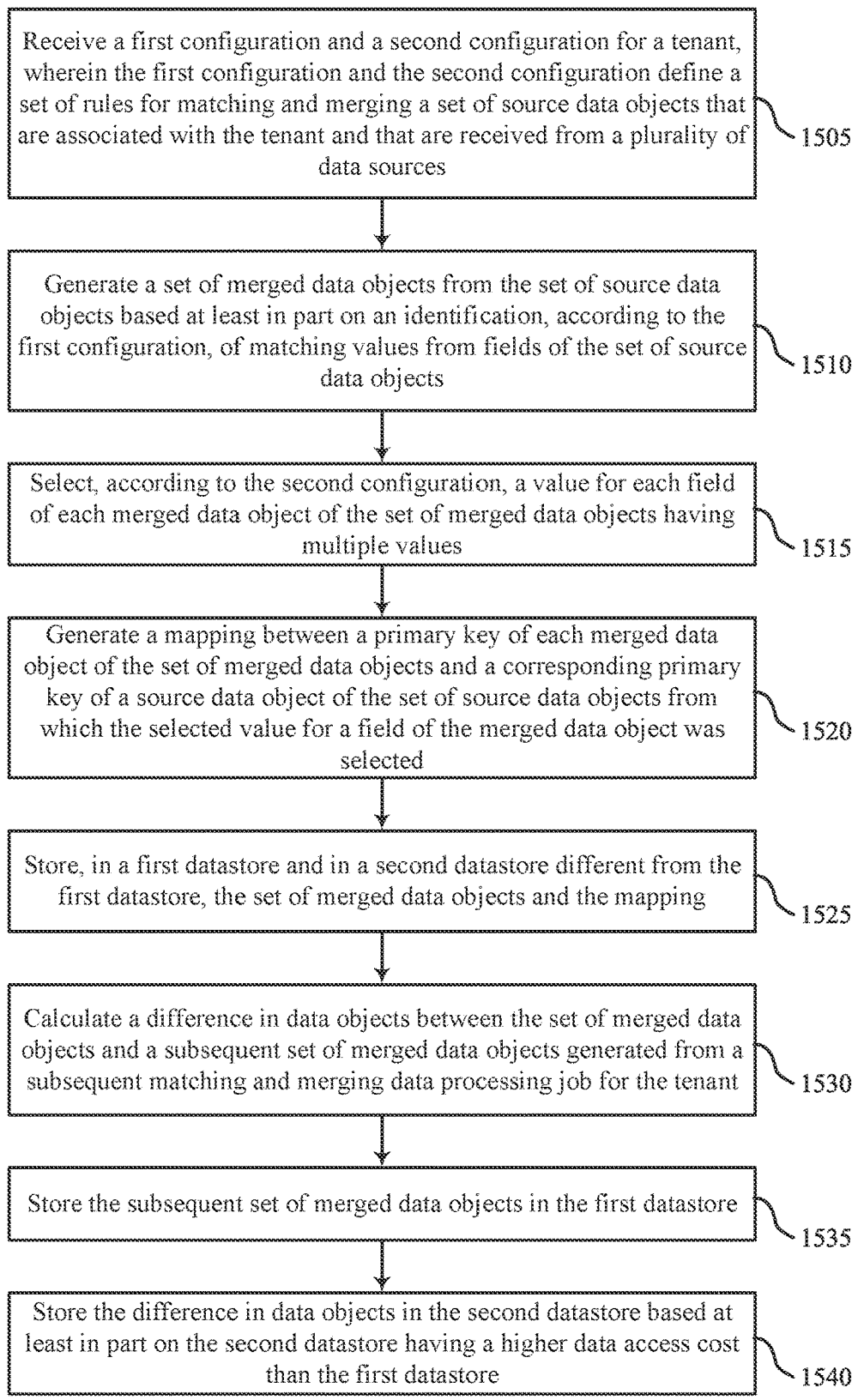

FIG. 15 shows a flowchart illustrating a method 1500 that supports user identifier match and merge process in accordance with aspects of the present disclosure. The operations of the method 1500 may be implemented by an application server or its components as described herein. For example, the operations of the method 1500 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1505, the method may include receiving a first configuration and a second configuration for a tenant, wherein the first configuration and the second configuration define a set of rules for matching and merging a set of source data objects that are associated with the tenant and that are received from a plurality of data sources. The operations of 1505 may be performed in accordance with examples as disclosed herein. In some examples, aspects of the operations of 1505 may be performed by a configuration component 925 as described with reference to FIG. 9.

At 1510, the method may include generating a set of merged data objects from the set of source data objects based at least in part on an identification, according to the first configuration, of matching values from fields of the set of source data objects. The operations of 1510 may be performed in accordance with examples as disclosed herein. In some examples, aspects of the operations of 1510 may be performed by a matching component 930 as described with reference to FIG. 9.

At 1515, the method may include selecting, according to the second configuration, a value for each field of each merged data object of the set of merged data objects having multiple values. The operations of 1515 may be performed in accordance with examples as disclosed herein. In some examples, aspects of the operations of 1515 may be performed by a merging component 935 as described with reference to FIG. 9.

At 1520, the method may include generating a mapping between a primary key of each merged data object of the set of merged data objects and a corresponding primary key of a source data object of the set of source data objects from which the selected value for a field of the merged data object was selected. The operations of 1520 may be performed in accordance with examples as disclosed herein. In some examples, aspects of the operations of 1520 may be performed by a mapping component 940 as described with reference to FIG. 9.

At 1525, the method may include storing, in a first datastore and in a second datastore different from the first datastore, the set of merged data objects and the mapping. The operations of 1525 may be performed in accordance with examples as disclosed herein. In some examples, aspects of the operations of 1525 may be performed by a datastore component 945 as described with reference to FIG. 9.

At 1530, the method may include calculating a difference in data objects between the set of merged data objects and a subsequent set of merged data objects generated from a subsequent matching and merging data processing job for the tenant. The operations of 1530 may be performed in accordance with examples as disclosed herein. In some examples, aspects of the operations of 1530 may be performed by a difference calculation component 960 as described with reference to FIG. 9.

At 1535, the method may include storing the subsequent set of merged data objects in the first datastore. The operations of 1535 may be performed in accordance with examples as disclosed herein. In some examples, aspects of the operations of 1535 may be performed by a storage component 965 as described with reference to FIG. 9.

At 1540, the method may include storing the difference in data objects in the second datastore based at least in part on the second datastore having a higher data access cost than the first datastore. The operations of 1540 may be performed in accordance with examples as disclosed herein. In some examples, aspects of the operations of 1540 may be performed by a difference storage component 970 as described with reference to FIG. 9.

Figure 16:
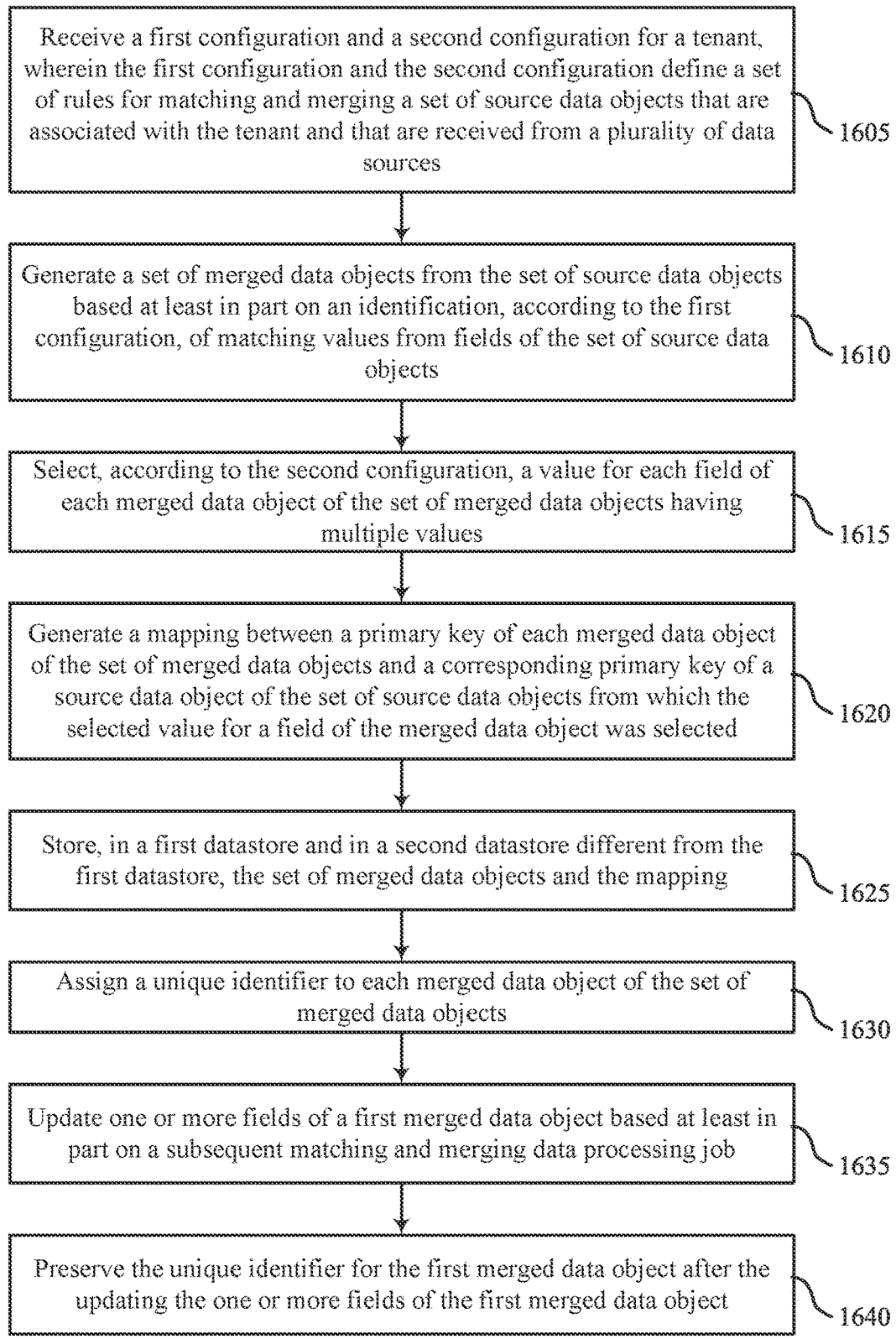

FIG. 16 shows a flowchart illustrating a method 1600 that supports user identifier match and merge process in accordance with aspects of the present disclosure. The operations of the method 1600 may be implemented by an application server or its components as described herein. For example, the operations of the method 1600 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1605, the method may include receiving a first configuration and a second configuration for a tenant, wherein the first configuration and the second configuration define a set of rules for matching and merging a set of source data objects that are associated with the tenant and that are received from a plurality of data sources. The operations of 1605 may be performed in accordance with examples as disclosed herein. In some examples, aspects of the operations of 1605 may be performed by a configuration component 925 as described with reference to FIG. 9.

At 1610, the method may include generating a set of merged data objects from the set of source data objects based at least in part on an identification, according to the first configuration, of matching values from fields of the set of source data objects. The operations of 1610 may be performed in accordance with examples as disclosed herein. In some examples, aspects of the operations of 1610 may be performed by a matching component 930 as described with reference to FIG. 9.

At 1615, the method may include selecting, according to the second configuration, a value for each field of each merged data object of the set of merged data objects having multiple values. The operations of 1615 may be performed in accordance with examples as disclosed herein. In some examples, aspects of the operations of 1615 may be performed by a merging component 935 as described with reference to FIG. 9.

At 1620, the method may include generating a mapping between a primary key of each merged data object of the set of merged data objects and a corresponding primary key of a source data object of the set of source data objects from which the selected value for a field of the merged data object was selected. The operations of 1620 may be performed in accordance with examples as disclosed herein. In some examples, aspects of the operations of 1620 may be performed by a mapping component 940 as described with reference to FIG. 9.

At 1625, the method may include storing, in a first datastore and in a second datastore different from the first datastore, the set of merged data objects and the mapping. The operations of 1625 may be performed in accordance with examples as disclosed herein. In some examples, aspects of the operations of 1625 may be performed by a datastore component 945 as described with reference to FIG. 9.

At 1630, the method may include assigning a unique identifier to each merged data object of the set of merged data objects. The operations of 1630 may be performed in accordance with examples as disclosed herein. In some examples, aspects of the operations of 1630 may be performed by a unique identifier component 975 as described with reference to FIG. 9.

At 1635, the method may include updating one or more fields of a first merged data object based at least in part on a subsequent matching and merging data processing job. The operations of 1635 may be performed in accordance with examples as disclosed herein. In some examples, aspects of the operations of 1635 may be performed by a field updating component 980 as described with reference to FIG. 9.

At 1640, the method may include preserving the unique identifier for the first merged data object after the updating the one or more fields of the first merged data object. The operations of 1640 may be performed in accordance with examples as disclosed herein. In some examples, aspects of the operations of 1640 may be performed by an identifier preservation component 985 as described with reference to FIG. 9.

Figure 17:
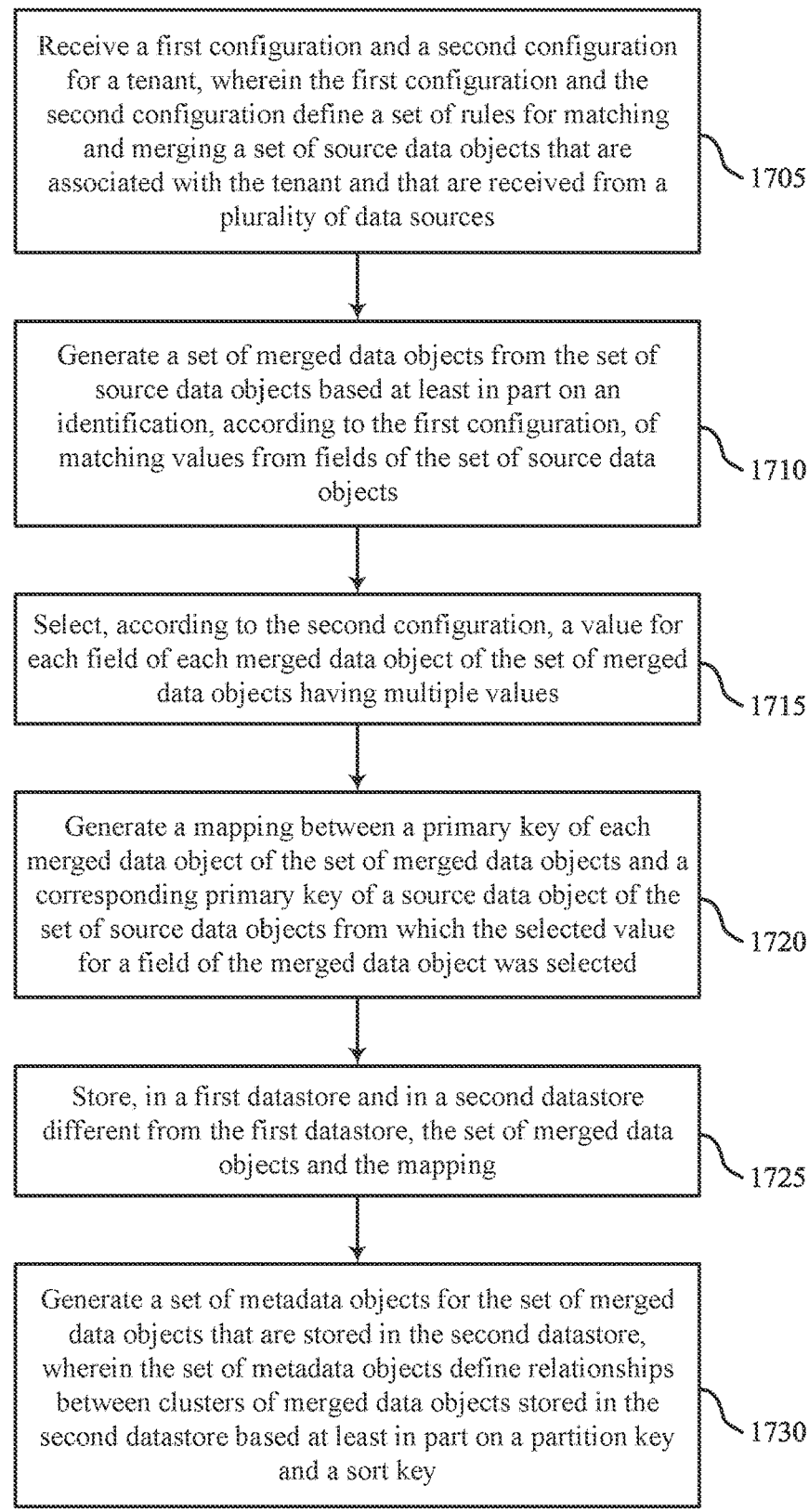

FIG. 17 shows a flowchart illustrating a method 1700 that supports user identifier match and merge process in accordance with aspects of the present disclosure. The operations of the method 1700 may be implemented by an application server or its components as described herein. For example, the operations of the method 1700 may be performed by an application server as described with reference to FIGS. 1 through 10. In some examples, an application server may execute a set of instructions to control the functional elements of the application server to perform the described functions. Additionally or alternatively, the application server may perform aspects of the described functions using special-purpose hardware.

At 1705, the method may include receiving a first configuration and a second configuration for a tenant, wherein the first configuration and the second configuration define a set of rules for matching and merging a set of source data objects that are associated with the tenant and that are received from a plurality of data sources. The operations of 1705 may be performed in accordance with examples as disclosed herein. In some examples, aspects of the operations of 1705 may be performed by a configuration component 925 as described with reference to FIG. 9.

At 1710, the method may include generating a set of merged data objects from the set of source data objects based at least in part on an identification, according to the first configuration, of matching values from fields of the set of source data objects. The operations of 1710 may be performed in accordance with examples as disclosed herein. In some examples, aspects of the operations of 1710 may be performed by a matching component 930 as described with reference to FIG. 9.

At 1715, the method may include selecting, according to the second configuration, a value for each field of each merged data object of the set of merged data objects having multiple values. The operations of 1715 may be performed in accordance with examples as disclosed herein. In some examples, aspects of the operations of 1715 may be performed by a merging component 935 as described with reference to FIG. 9.

At 1720, the method may include generating a mapping between a primary key of each merged data object of the set of merged data objects and a corresponding primary key of a source data object of the set of source data objects from which the selected value for a field of the merged data object was selected. The operations of 1720 may be performed in accordance with examples as disclosed herein. In some examples, aspects of the operations of 1720 may be performed by a mapping component 940 as described with reference to FIG. 9.

At 1725, the method may include storing, in a first datastore and in a second datastore different from the first datastore, the set of merged data objects and the mapping. The operations of 1725 may be performed in accordance with examples as disclosed herein. In some examples, aspects of the operations of 1725 may be performed by a datastore component 945 as described with reference to FIG. 9.

At 1730, the method may include generating a set of metadata objects for the set of merged data objects that are stored in the second datastore, wherein the set of metadata objects define relationships between clusters of merged data objects stored in the second datastore based at least in part on a partition key and a sort key. The operations of 1730 may be performed in accordance with examples as disclosed herein. In some examples, aspects of the operations of 1730 may be performed by a metadata generation component 990 as described with reference to FIG. 9.

A method is described. The method may include receiving a first configuration and a second configuration for a tenant, wherein the first configuration and the second configuration define a set of rules for matching and merging a set of source data objects that are associated with the tenant and that are received from a plurality of data sources, generating a set of merged data objects from the set of source data objects based at least in part on an identification, according to the first configuration, of matching values from fields of the set of source data objects, selecting, according to the second configuration, a value for each field of each merged data object of the set of merged data objects having multiple values, generating a mapping between a primary key of each merged data object of the set of merged data objects and a corresponding primary key of a source data object of the set of source data objects from which the selected value for a field of the merged data object was selected, and storing, in a first datastore and in a second datastore different from the first datastore, the set of merged data objects and the mapping.

An apparatus is described. The apparatus may include a processor, memory coupled with the processor, and instructions stored in the memory. The instructions may be executable by the processor to cause the apparatus to receive a first configuration and a second configuration for a tenant, wherein the first configuration and the second configuration define a set of rules for matching and merging a set of source data objects that are associated with the tenant and that are received from a plurality of data sources, generate a set of merged data objects from the set of source data objects based at least in part on an identification, according to the first configuration, of matching values from fields of the set of source data objects, select, according to the second configuration, a value for each field of each merged data object of the set of merged data objects having multiple values, generate a mapping between a primary key of each merged data object of the set of merged data objects and a corresponding primary key of a source data object of the set of source data objects from which the selected value for a field of the merged data object was selected, and store, in a first datastore and in a second datastore different from the first datastore, the set of merged data objects and the mapping.

Another apparatus is described. The apparatus may include means for receiving a first configuration and a second configuration for a tenant, wherein the first configuration and the second configuration define a set of rules for matching and merging a set of source data objects that are associated with the tenant and that are received from a plurality of data sources, means for generating a set of merged data objects from the set of source data objects based at least in part on an identification, according to the first configuration, of matching values from fields of the set of source data objects, means for selecting, according to the second configuration, a value for each field of each merged data object of the set of merged data objects having multiple values, means for generating a mapping between a primary key of each merged data object of the set of merged data objects and a corresponding primary key of a source data object of the set of source data objects from which the selected value for a field of the merged data object was selected, and means for storing, in a first datastore and in a second datastore different from the first datastore, the set of merged data objects and the mapping.

A non-transitory computer-readable medium storing code is described. The code may include instructions executable by a processor to receive a first configuration and a second configuration for a tenant, wherein the first configuration and the second configuration define a set of rules for matching and merging a set of source data objects that are associated with the tenant and that are received from a plurality of data sources, generate a set of merged data objects from the set of source data objects based at least in part on an identification, according to the first configuration, of matching values from fields of the set of source data objects, select, according to the second configuration, a value for each field of each merged data object of the set of merged data objects having multiple values, generate a mapping between a primary key of each merged data object of the set of merged data objects and a corresponding primary key of a source data object of the set of source data objects from which the selected value for a field of the merged data object was selected, and store, in a first datastore and in a second datastore different from the first datastore, the set of merged data objects and the mapping.

In some examples of the method, apparatuses, and non-transitory computer-readable medium described herein, and the method, apparatuses, and non-transitory computer-readable medium may include further operations, features, means, or instructions for identifying a subset of source data objects that may have matching values for a first set of fields and mismatching values for a second set of fields and determining that the subset of source data objects satisfy a matching criteria based at least in part on the matching values for the first set of fields and the first configuration.

In some examples of the method, apparatuses, and non-transitory computer-readable medium described herein, the second configuration comprises rules for determining which value for each field of the merged data object having multiple field values to select based at least in part on a data source type associated with the source data object, a recentness of data input associated with the source data object, a frequency of data input associated with the source data object, or a combination thereof.

Some examples of the method, apparatuses, and non-transitory computer-readable medium described herein may further include operations, features, means, or instructions for determining that a scheduled trigger condition associated with performing a matching and merging data processing job for the tenant may have been satisfied and initiating the matching and merging data processing job for the tenant based at least in part on determining that the trigger condition may have been satisfied.

In some examples of the method, apparatuses, and non-transitory computer-readable medium described herein, initiating the matching and merging data processing job may include operations, features, means, or instructions for checking a status of one or more conditions configured for the tenant.

In some examples of the method, apparatuses, and non-transitory computer-readable medium described herein, the one or more conditions configured for the tenant comprises a match and merge process enablement condition, a repeated failure threshold, a processing job quota for the tenant, a required mapping condition, a new data condition, a mapping update condition, or a combination thereof In some examples of the method, apparatuses, and non-transitory computer-readable medium described herein, initiating the matching and merging data processing job may include operations, features, means, or instructions for provisioning a cluster of computational resources in a first database system to perform the matching and merging data processing job, wherein the first database system may be different from a second database system that stores the first configuration and the second configuration for the tenant.

Some examples of the method, apparatuses, and non-transitory computer-readable medium described herein may further include operations, features, means, or instructions for calculating a difference in data objects between the set of merged data objects and a subsequent set of merged data objects generated from a subsequent matching and merging data processing job for the tenant, storing the subsequent set of merged data objects in the first datastore, and storing the difference in data objects in the second datastore based at least in part on the second datastore having a higher data access cost than the first datastore.

In some examples of the method, apparatuses, and non-transitory computer-readable medium described herein, the difference in data objects comprises a set of new merged data objects, a set of updated merged data objects, or both.

Some examples of the method, apparatuses, and non-transitory computer-readable medium described herein may further include operations, features, means, or instructions for assigning a unique identifier to each merged data object of the set of merged data objects, updating one or more fields of a first merged data object based at least in part on a subsequent matching and merging data processing job, and preserving the unique identifier for the first merged data object after the updating the one or more fields of the first merged data object.

In some examples of the method, apparatuses, and non-transitory computer-readable medium described herein, and the method, apparatuses, and non-transitory computer-readable medium may include further operations, features, means, or instructions for receiving a selection from a user associated with the tenant of parameters of the first configuration and parameters of the second configuration.

In some examples of the method, apparatuses, and non-transitory computer-readable medium described herein, the fields of the set of source data objects comprise one or more name fields, one or more contact information fields, one or more address fields, or a combination thereof.

In some examples of the method, apparatuses, and non-transitory computer-readable medium described herein, the first datastore comprises a relational database and the second datastore comprises a non-relational database.

Some examples of the method, apparatuses, and non-transitory computer-readable medium described herein may further include operations, features, means, or instructions for generating a set of metadata objects for the set of merged data objects that may be stored in the second datastore, wherein the set of metadata objects define relationships between clusters of merged data objects stored in the second datastore based at least in part on a partition key and a sort key.

In some examples of the method, apparatuses, and non-transitory computer-readable medium described herein, the set of metadata objects define fields of the merged data objects that may be configured for indexing.

Some examples of the method, apparatuses, and non-transitory computer-readable medium described herein may further include operations, features, means, or instructions for defining an index in the second datastore defining relationships between the partition key and the sort key for the set of merged data objects that may be stored in the second datastore.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing comprising:
   receiving a first configuration and a second configuration for a tenant, wherein the first configuration and the second configuration define a set of matching and merging rules for a set of source data objects associated with the tenant; and
   initiating a matching and merging data processing lob for the tenant based at least in part on determining that a trigger condition associated with the tenant has been satisfied, wherein the matching and merging data processing job comprises:
   generating, according to the first configuration, a set of merged data objects from the set of source data objects based at least in part on identifying matching fields in the set of source data objects;
   selecting, from the set of source data objects according to the second configuration, values for fields of the set of merged data objects;
   generating a mapping between primary keys of the set of merged data objects and corresponding primary keys of the set of source data objects from which the values for the fields of the set of merged data objects were selected; and
   storing the set of merged data objects and the mapping in a first datastore and a second datastore different from the first datastore.

2. The method of claim 1, wherein generating the set of merged data objects from the set of source data objects comprises:
   identifying a subset of source data objects that have matching values for a first set of fields and mismatching values for a second set of fields; and
   determining that the subset of source data objects satisfy a matching criteria based at least in part on the matching values for the first set of fields and the first configuration.

3. The method of claim 1, wherein the second configuration comprises rules for selecting the values for the fields of the set of merged data objects based at least in part on a data source type associated with the set of source data objects, a recentness of data input associated with set of source data objects, a frequency of data input associated with the set of source data objects, or a combination thereof.

4. The method of claim 1, wherein initiating the matching and merging data processing job comprises:
   checking a status of one or more conditions configured for the tenant.

5. The method of claim 4, wherein the one or more conditions configured for the tenant comprises a match and merge process enablement condition, a repeated failure threshold, a processing job quota for the tenant, a required mapping condition, a new data condition, a mapping update condition, or a combination thereof.

6. The method of claim 1, wherein initiating the matching and merging data processing job comprises:
   provisioning a cluster of computational resources in a first database system to perform the matching and merging data processing job, wherein the first database system is different from a second database system that stores the first configuration and the second configuration for the tenant.

7. The method of claim 1, further comprising:
   calculating a difference in data objects between the set of merged data objects and a subsequent set of merged data objects generated from a subsequent matching and merging data processing job for the tenant;
   storing the subsequent set of merged data objects in the first datastore; and
   storing the difference in data objects in the second datastore based at least in part on the second datastore having a higher data access cost than the first datastore.

8. The method of claim 7, wherein the difference in data objects comprises a set of new merged data objects, a set of updated merged data objects, or both.

9. The method of claim 1, further comprising:
   assigning unique identifiers to the set of merged data objects;

updating one or more fields of a first merged data object based at least in part on a subsequent matching and merging data processing job; and preserving a unique identifier for the first merged data object after updating the one or more fields of the first merged data object.

10. The method of claim 1, wherein receiving the first configuration and the second configuration for the tenant comprises:

receiving a selection from a user associated with the tenant of parameters of the first configuration and parameters of the second configuration.

11. The method of claim 1, wherein the fields of the set of source data objects comprise one or more name fields, one or more contact information fields, one or more address fields, or a combination thereof.

12. The method of claim 1, wherein the first datastore comprises a relational database and the second datastore comprises a non-relational database.

13. The method of claim 1, further comprising:

generating a set of metadata objects for the set of merged data objects that are stored in the second datastore, wherein the set of metadata objects define relationships between clusters of merged data objects stored in the second datastore based at least in part on a partition key and a sort key.

14. The method of claim 13, wherein the set of metadata objects define fields of the set of merged data objects that are configured for indexing.

15. The method of claim 13, further comprising:

defining an index in the second datastore defining relationships between the partition key and the sort key for the set of merged data objects that are stored in the second datastore.

16. An apparatus for data processing, comprising:

a processor;

memory coupled with the processor; and instructions stored in the memory and executable by the processor to cause the apparatus to:

receive a first configuration and a second configuration for a tenant, wherein the first configuration and the second configuration define a set of matching and merging rules for a set of source data objects associated with the tenant; and initiate a matching and merging data processing job for the tenant based at least in part on a determination that a trigger condition associated with the tenant has been satisfied, wherein the matching and merging data processing lob comprises:

generating, according to the first configuration, a set of merged data objects from the set of source data objects based at least in part on identifying matching fields in the set of source data objects;

selecting, from the set of source data objects according to the second configuration, values for fields of the set of merged data objects;

generating a mapping between primary keys of the set of merged data objects and corresponding primary keys of the set of source data objects from which the steed values for the fields of the set of merged data objects were selected; and storing the set of merged data objects and the mapping in a first datastore and a second datastore different from the first datastore.

17. The apparatus of claim 16, wherein the instructions are further executable by the processor to cause the apparatus to:

identify a subset of source data objects that have matching values for a first set of fields and mismatching values for a second set of fields; and determine that the subset of source data objects satisfy a matching criteria based at least in part on the matching values for the first set of fields and the first configuration.

18. The apparatus of claim 16, wherein the second configuration comprises rules for selecting the values for the fields of the set of merged data objects based at least in part on a data source type associated with the set of source data objects, a recentness of data input associated with the set of source data objects, a frequency of data input associated with the set of source data objects, or a combination thereof.

19. A non-transitory computer-readable medium storing code for data processing, the code comprising instructions executable by a processor to:

receive a first configuration and a second configuration for a tenant, wherein the first configuration and the second configuration define a set of matching and merging rules for a set of source data objects associated with the tenant; and initiate a matching and merging data processing job for the tenant based at least in part on a determination that a trigger condition associated with the tenant has been satisfied, wherein the matching and merging data processing job comprises:

generating, according to the first configuration, a set of merged data objects from the set of source data objects based at least in part on identifying matching fields in the set of source data objects;

selecting, from the set of source data objects according to the second configuration, values for fields of the set of merged data objects;

generating a mapping between primary keys of the set of merged data objects and corresponding primary keys of the set of source data objects from which the values for the fields of the set of merged data objects were selected; and storing the set of merged data objects and the mapping in a first datastore and a second datastore different from the first datastore.

* * * * *